(12) United States Patent
Hwang et al.

(10) Patent No.: US 12,517,358 B2
(45) Date of Patent: Jan. 6, 2026

(54) SPECTACLE-TYPE TERMINAL DEVICE HAVING COMPACT STRUCTURE AND METHOD OF PROVIDING IMAGE THEREOF

(71) Applicant: LG ELECTRONICS INC., Seoul (KR)

(72) Inventors: Changkyu Hwang, Seoul (KR); Seungyong Shin, Seoul (KR); Seungsu Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 18/003,298

(22) PCT Filed: Jun. 14, 2021

(86) PCT No.: PCT/KR2021/007378
§ 371 (c)(1),
(2) Date: Dec. 23, 2022

(87) PCT Pub. No.: WO2021/261821
PCT Pub. Date: Dec. 30, 2021

(65) Prior Publication Data
US 2023/0251487 A1    Aug. 10, 2023

(30) Foreign Application Priority Data

Jun. 23, 2020 (KR) .................. 10-2020-0076457
Jun. 30, 2020 (KR) .................. 10-2020-0080150

(51) Int. Cl.
*G02B 27/01* (2006.01)
*G02B 5/32* (2006.01)
*G02B 27/00* (2006.01)

(52) U.S. Cl.
CPC .......... *G02B 27/0172* (2013.01); *G02B 5/32* (2013.01); *G02B 27/0093* (2013.01);
(Continued)

(58) Field of Classification Search
CPC .. G02B 27/0172; G02B 5/32; G02B 27/0093; G02B 27/0103; G02B 2027/0109;
(Continued)

(56) References Cited

U.S. PATENT DOCUMENTS

2016/0048036 A1* 2/2016 Cazalet ............. G02B 27/0176
                                                          16/228
2019/0339523 A1* 11/2019 Evans .................. G02B 27/017
2020/0393685 A1* 12/2020 Isaacs ................ G02B 27/0176

FOREIGN PATENT DOCUMENTS

JP        2019522234        8/2019
KR      1020140136145      11/2014
(Continued)

OTHER PUBLICATIONS

PCT International Application No. PCT/KR2021/007378 International Search Report dated Sep. 16, 2021, 2 pages.

*Primary Examiner* — Collin X Beatty
(74) *Attorney, Agent, or Firm* — LEE, HONG, DEGERMAN, KANG & WAIMEY

(57) ABSTRACT

A spectacle-type terminal device comprises: a lens; a front body portion configured to allow parts to be mounted thereon and formed to support and secure the lens; and an optical engine disposed in a region within the front body portion and generating an image light that serves as an image source of a virtual image. There may be formed a holographic optical element (HOE), which is formed in at least one area of photopolymers formed on an inner surface or
(Continued)

inside area of the lens, and is configured to display a virtual image corresponding to the image light by diffracting the image light.

19 Claims, 33 Drawing Sheets

(52) U.S. Cl.
CPC .. *G02B 27/0103* (2013.01); *G02B 2027/0109* (2013.01); *G02B 2027/0138* (2013.01); *G02B 2027/014* (2013.01); *G02B 2027/0174* (2013.01); *G02B 2027/0178* (2013.01); *G02B 2027/0187* (2013.01)

(58) Field of Classification Search
CPC ...... G02B 2027/0138; G02B 2027/014; G02B 2027/0174; G02B 2027/0178; G02B 2027/0187; G02B 2027/0123; G02B 1/14; G02B 27/01; G02B 27/017; G02B 27/0176; G02C 11/00; G03H 1/22
See application file for complete search history.

(56) References Cited

FOREIGN PATENT DOCUMENTS

| | | |
|---|---|---|
| KR | 1020170055992 | 5/2017 |
| KR | 1020190124174 | 11/2019 |
| WO | 2020120297 | 6/2020 |

* cited by examiner (a)

(b)

(a)

(b)

(a)

(b)

(a)

(b)

(c)

(a)

(b)

(a)

(b)

(a)

(b)

(a)

(b)

(c)

(d)

(a)

(b)

(a)

(b)

SPECTACLE-TYPE TERMINAL DEVICE HAVING COMPACT STRUCTURE AND METHOD OF PROVIDING IMAGE THEREOF

CROSS-REFERENCE TO RELATED APPLICATION(S)

This application is the National Stage filing under 35 U.S.C. 371 of International Application No. PCT/KR2021/007378, filed on Jun. 14, 2021, which claims the benefit of earlier filing date and right of priority to Korean Application Nos. 10-2020-0076457, filed on Jun. 23, 2020, and 10-2020-0080150, filed on Jun. 30, 2020, the contents of which are all incorporated by reference herein in their entirety.

TECHNICAL FIELD

The present disclosure relates to a spectacle-type terminal device, and more particularly, to a spectacle-type terminal device

BACKGROUND ART

As an information age advances rapidly, importance of a display device configured to implement a realistic screen has been emphasized. An example of a display device includes a wearable spectacle-type terminal device such as a head-mounted display (HMD) or smart glasses.

The HMD is configured such that a screen in front of eyes is viewed using safety glasses or a helmet-type device and developed to implement a virtual reality. In addition, in the wearable spectacle-type terminal device, a small display such as a liquid-crystal display is installed in a location near both eyes. Thus, a focus may be provided to constitute a virtual screen, i.e., a virtual image on glass in the spectacle-type terminal device using an optical system performing light refraction on image light generated from a subminiature display device, generally as a method of projecting an image.

Since a screen is implemented in a see-through form through a virtual image provided on the glass, the spectacle-type terminal device may be configured to implement augmented reality (AR) or mixed reality as well as virtual reality (VR) images.

A display optical system of a general spectacle-type terminal device is configured to use, as a source of an image, light having an extremely short wavelength such as laser light and reflect the image from the laser light on the glass of the spectacle-type terminal device using a micro electro mechanical system (MEMS) mirror scanner, to implement a virtual image. In this case, a diffraction aberration problem due to off-axis configuration does not occur. However, since laser light is reflected on an eye of a human body, there is an emerging problem of eye safety such that a fragile human organ such as an eye may be damaged. In addition, as the MEMS mirror scanner is used, a structure of an optical system becomes complicated and a size thereof also increases. Thus, it may be difficult to manufacture a compact spectacle-type terminal device.

In addition, when the spectacle-type terminal device is worn, an optical system error caused by partial bending of a frame may occur due to an arrangement structure of the optical system.

DISCLOSURE OF INVENTION

Technical Problem

Therefore, to obviate those problems, an aspect of the detailed description is to provide a spectacle-type terminal device and a method of providing a virtual image using the same.

In addition, an aspect of the detailed description is to provide a spectacle-type terminal device having a compact structure even when a structure of an optical system becomes complicated.

In addition, an aspect of the detailed description is to provide a spectacle-type terminal device having a compact size by generating a virtual image by reflecting an image, provided by an image source, on glass without a micro electro mechanical system (MEMS) mirror scanner.

In addition, the present disclosure provides a spectacle-type terminal device capable of resolving a problem of an optical system error that may be caused by partial bending of a frame when the spectacle-type terminal device is worn.

Solution to Problem

To achieve these and other advantages and in accordance with the purpose of the present disclosure, as embodied and broadly described herein, there is provided a spectacle-type terminal device. A spectacle-type terminal device includes: a lens; a front body portion configured to allow parts to be mounted thereon and formed to support and secure the lens; and an optical engine disposed in a region within the front body portion and configured to generate an image light that serves as an image source of a virtual image. There may be formed a holographic optical element (HOE), which is formed in at least one area of photopolymers formed on an inner surface or inside area of the lens, and is configured to display a virtual image corresponding to the image light by diffracting the image light.

According to an embodiment, the photopolymers in which the HOE is formed, and the optical engine may be arranged in the front body portion.

According to an embodiment, the optical engine may include a diffraction element configured to reflectively diffract the image light at a preset angle, and the HOE may be a first HOE configured to, when the image light is reflectively diffracted to be thereby dispersed, offset the dispersion of the image light, reflect the image light of which the dispersion is offset, and thus, display a virtual image corresponding to the image light.

According to an embodiment, the diffraction element may include a second HOE configured to transmit light when the light is incident at an angle within a preset range of incident angles, and reflect light when the light is incident at an angle within a preset range of reflection angles; and a first reflection element arranged so that a reflection surface is directed toward the second HOE at a preset angle.

According to an embodiment, the optical engine may be mounted in an internal region of a body portion provided integrally with a front frame of the front body portion to prevent a change in an arrangement location of the optical engine due to force twisting a structure of the front body portion when the spectacle-type terminal device is worn.

According to an embodiment, the spectacle-type terminal device may further include: a temple body portion coupled to the front body portion by a hinge portion to be folded at a certain angle with respect to the front body portion; and a flexible printed circuit board (FPCB) electrically coupled to the optical engine and arranged in the front body portion and the temple body portion to surround the hinge portion.

According to an embodiment, the spectacle-type terminal device may further include: a printed circuit board (PCB) electrically coupled to the FPCB, arranged to be erected in an internal region of the temple body portion at a certain angle, and having a certain length and width.

According to an embodiment, the PCB may be arranged in the temple body portion instead of being arranged in the front body portion to reduce a thickness of the spectacle-type terminal device during being folded.

According to an embodiment, a battery may be arranged between an internal region of the PCB and an empty space of the temple body portion so that the PCB and the battery are accommodated in the empty space of the temple body portion, and the PCB may receive power from the battery to supply the power to the optical engine.

According to an embodiment, the spectacle-type terminal device may further include an FPCB shield membrane arranged outside the hinge portion so that the FPCB arranged to surround the hinge portion is not exposed to outside even when the spectacle-type terminal device is folded.

According to an embodiment, a front frame rim may be provided in a front frame of the front body portion so that the lens and the photopolymers are secured to the front frame. Accordingly, a point adhesive or a resin may be provided on side surfaces of the lens and the photopolymers to prevent penetration of a liquid foreign material.

According to an embodiment, the point adhesive or the resin may be configured in the front frame to be prevented from being inclined toward one side or overflowing, and a spacer structure may be arranged in an internal space of an external body of the front surface.

According to an embodiment, the spectacle-type terminal device may further include a first rim and a second rim each provided to surround the FPCB and have a plate shape to fix the FPCB to a first region of the front body portion and a second region of the temple body portion.

According to an embodiment, the first rim may be arranged to be fixed to the first region to prevent penetration of a liquid foreign material, introduced during folding, into the front frame, and the second rim may be arranged to be fixed to the second region to prevent penetration of a liquid foreign material, introduced during folding, into the front frame.

According to an embodiment, a button portion may be provided to be exposed in a lower region of the temple body portion, and a button structure into which the button portion is inserted may be provided inside the temple body portion. The button structure may be provided to include a waterproof member including a silicon or rubber material to prevent penetration of a liquid foreign material through the lower region of the temple body portion.

According to an embodiment, the optical engine may be provided to have a cylindrical structure, and the first reflection element and a second reflection element provided as the second HOE are arranged in an upper region of the cylindrical structure at different angles. By the first reflection element and the second reflection element provided at different angles, the image light may be reflected onto the first reflection element and the second reflection element and is directed toward the HOE formed in the photopolymers.

According to an embodiment, a micro display may be arranged in a lower portion of the cylindrical structure to output image light having a certain wavelength band.

According to an embodiment, the micro display may be arranged to be directed toward the second HOE at an angle within a range of incident angles, and provided such that image light incident on the second HOE penetrates through the second HOE.

According to an embodiment, the first reflection element may be arranged to be inclined further toward one axial direction compared to the second HOE, and configured to reflect light having penetrating through a first surface of the second HOE onto a second surface of the second HOE.

According to an embodiment, a reflection surface of the first reflection element and a second surface of the second hologram optical element may be arranged to face each other, so that a first path in which light penetrates through the second HOE and proceeds toward the reflection surface of the first reflection element overlaps a second path in which light having been reflected on the reflection surface of the first reflection proceeds toward the second surface of the second HOE.

According to an embodiment, the spectacle-type terminal device may further include a tilting portion configured to change an angle at which the reflection surface is directed toward the second HOE, by rotating the first reflection element at a certain angle.

According to an embodiment, when the first reflection element rotates to increase an incident angle of light incident on a second surface of the second HOE, a display position of the virtual image on the lens may be moved in a direction of a middle portion between eyebrows of a user, and when the first reflection element rotates to decrease an incident angle of the light incident on the second surface of the second HOE, a display position of the virtual image on the lens may be moved in a direction of temples of the user.

According to an embodiment, the optical engine may include a display arranged in a lower portion of the optical engine having a cylindrical structure; the second HOE including first and second projection lenses which are arranged in an optical path of light provided by the display and of which regions are configured to be distinguished from each other in a vertical direction; and a location varied portion configured to adjust a field of view (FOV) in a vertical direction of the spectacle-type terminal device, by controlling one of the first and second projection lenses to be arranged in the optical path provided by the display.

According to an embodiment, the spectacle-type terminal device may further include a controller configured to transmit a control signal to the location varied portion. The controller may be configured to change the FOV in a vertical direction, by moving vertical positions of the display, the lens, the second HOE, and the first reflection element in a synchronization state, each included in the optical engine, and extend a vertical coverage of the FOV by moving a vertical position of the second HOE to arrange one of the first and second projection lenses in the optical path provided from the display.

Advantageous Effects of Invention

Hereinafter, in accordance with the detailed description, effects of a spectacle-type terminal device and a method of providing a virtual image using the same are described.

According to at least one of embodiments of the present disclosure, a spectacle-type terminal device having a compact structure may be provided by separating an optical structure from a circuit portion.

According to at least one of embodiments of the present disclosure, a problem of an optical system error caused by partial bending phenomenon of a frame when the spectacle-type terminal device is worn may be resolved by arranging an optical engine in a front body portion of the spectacle-type terminal device.

In the present disclosure, a virtual image may be generated using a source of long-wavelength light having a large wavelength width than that of a general laser light source, and a negative dispersion phenomenon according to the long-wavelength light may be offset using a holographic element to generate a virtual image on glass without having to use short-wavelength laser light.

Accordingly, in the present disclosure, an eye safety problem due to the short wavelength laser light may be resolved. In addition, since a micro electro mechanical system (MEMS) mirror scanner configured to reflect the short wavelength laser light is not included, a size of an optical system may be reduced. Thus, a compact spectacle-type terminal device may be provided.

MODE FOR THE INVENTION

Figure 1A:
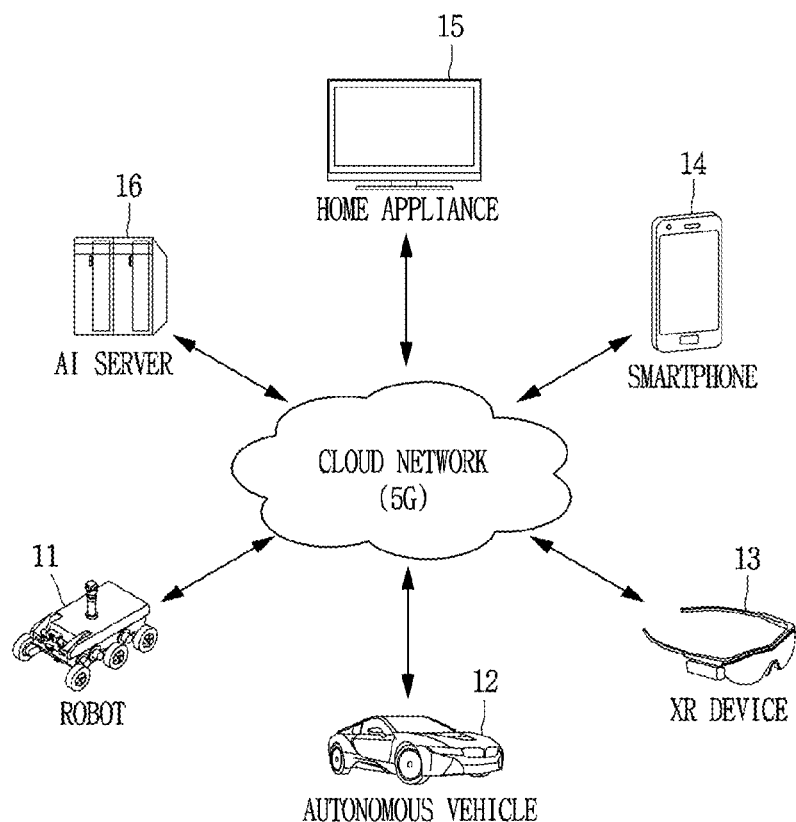
FIG. 1A is a conceptual diagram illustrating an embodiment of an artificial intelligence (AI) apparatus.

It is noted that the technical terms used herein are used only to describe specific embodiments and are not intended to limit the invention. In addition, a singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

In the present disclosure, the terms "comprising" and "including" should not be construed to necessarily include all of the elements or steps disclosed herein, and should be construed not to include some of the elements or steps thereof, or should be construed to further include additional elements or steps.

In addition, in describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. In addition, each of the embodiments described below, as well as combinations of embodiments, are changes, equivalents, or substitutes included in the spirit and technical scope of the present disclosure, and may fall within the spirit and technical scope of the present disclosure.

The spectacle-type terminal device described herein may be configured to interoperate with a peripheral terminal. As an example, the spectacle-type terminal device may be configured to display content received from a terminal owned by a user or a peripheral terminal. As another example, the spectacle-type terminal device may be configured to display content received by interoperating with a peripheral device or a server via a cloud network. In relation to this, the spectacle-type terminal device may be configured to display content received by interoperating with a peripheral device or a server via fifth generation (5G) communication.

[5G Scenario]

Three main requirement areas for 5G technology include (1) an enhanced mobile broadband (eMBB) area, (2) a massive machine type communication (mMTC) area, and (3) an ultra-reliable and low latency communications (URLLC) area.

In some use cases, several areas may be needed for optimization. Other use cases may focus only on one key performance indicator (KPI). The 5G technology supports these various use cases using a flexible and reliable method.

The eMBB provides significantly enhanced Internet access compared to basic mobile Internet access, and covers sufficient bidirectional operations and media and entertainment applications in a cloud or augmented reality. Data is one of key driving forces of the 5g technology. Main causes of increased traffic volume include an increase in a content size and an increase in the number of applications in need of a high data transmission rate. Streaming services (audio and video), interactive video, and mobile Internet connections will be widely used as many devices connect to an Internet service.

Many of these applications need always-on connectivity to push real-time information and notifications to a user. Cloud storage and applications are growing rapidly in mobile communication platforms, which may be applied to both work and entertainment. In addition, the cloud storage is a special use case that encourages a growth of uplink data transmission rates. The 5g technology is also used for cloud-based remote work, and requires much lower end-to-end latency to maintain a good user experience when tactile interfaces are used. Entertainment, e.g., cloud gaming and video streaming are other key factors in increasing a need for mobile broadband capabilities. Entertainment is essential in smartphones, or tablet PCs in any place including an environment with high mobility, e.g., a train, a vehicle, or an airplane. Another use case includes augmented reality and information retrieval for entertainment. Here, augmented reality needs very low latency and spontaneous data amount.

In addition. one of a most frequently anticipated 5G use cases relates to a function capable of smoothly connecting an embedded sensor in all fields, i.e., massive machine type communication (mMTC). Until the year 2020, the number of potential Internet of things (IoT) devices is expected to reach 20.4 billion. Industrial IoT is one of areas in which the 5G technology plays a main role to enable construction of smart cities, asset tracking, smart utilities, or agriculture and security infrastructures.

Ultra-reliable and low-latency communications (URLLC) services include a new service for changing industries through ultra-reliable/low-latency available links, such as remote control of key infrastructures and self-driving vehicle. A level of reliability and latency is essential to smart grid control, industrial automation, robotics, and drone control and adjustment.

Then, hereinafter, several use cases are described in detail.

The 5G technology may compensate for fiber-to-the home (FTTH) and cable-based broadband (or data over cable service interface specification (DOCSIS)) as the means for providing streams rated at hundreds of megabits per second to gigabits per second. Such a high speed is required to transmit television information with a resolution of 4K or more (6K, 8K, or more), as well as virtual reality and augmented reality. Virtual reality (VR) and augmented reality (AR) applications mostly include immersive sport games. Particular applications may require special network settings. For example, in a case of an VR game, game companies may need to integrate a core server with an edge network server of a network operator to minimize latency.

Automotive vehicles are expected to be an important new driving force for the 5G technology along with many use cases for mobile communication of vehicles. For example, entertainment for passengers simultaneously require high capacity and a mobile broadband with high mobility. This is because future users expect continuous high-quality connections regardless of their positions and speeds. Another use case in an automotive field is an AR dashboard. This identifies an object in darkness, and overlaps what a driver views through a front window with information indicating a distance from and a motion of the object to display the information to a driver. In future, a wireless module will allow communication between vehicles, information exchange between a vehicle and a supporting infrastructure, and information exchange between an automotive vehicle and other devices connected thereto (e.g., devices accompanied by pedestrians).

A safety system may reduce a risk of an accident by guiding substitute courses of action of a driver so that the driver may drive more safely. Then, the next step will be a remote controlled or self-driven vehicle. This requires highly reliable and high-speed communication between self-driven vehicles and between an automotive vehicle and an infrastructure. In future, a self-driven vehicle will perform all driving operations and a driver will focus only on traffic anomalies that cannot be identified by a vehicle. Technical requirements for a self-driven vehicle include ultra-low latency and ultra-fast reliability to increase traffic safety to a level unachievable by human.

Smart cities and smart homes, referred to as a smart society, will be embedded with a high-density wireless sensor network. A distributed network of intelligence sensors will identify conditions for a cost and energy-efficient maintenance of a city or home. A similar setting may be performed for each household. Temperature sensors, window and heating controllers, burglar alarms and home appliances are all wirelessly connected to each other. Many of these sensors generally involve a low data transmission rate, low power, and a low cost. However, for example, real-time high-definition (HD) video images may be needed in a particular type of devices to perform monitoring.

Since consumption and distribution of energy including heat or gas is highly decentralized, automated control of a distributed sensor network is needed. A smart grid connects these sensors to each other using digital information and communication technology to collect information and perform a function accordingly. This information may include behaviors of suppliers and consumers. Thus, the smart grid may improve efficiency, reliability, economics, sustainability of production. and distribution of fuels such as electricity using an automated way. The smart grid may also be regarded as another sensor network with low-latency.

A health sector retains many applications that may benefit from mobile communications. A communication system may support telemedicine providing clinical practices from remote locations. This may help to reduce a barrier with respect to a distance and improve access to healthcare services that are not consistently available in remote rural areas. The communication system is also used to save lives in critical medical treatment and emergencies. A wireless sensor network based on mobile communication may provide remote monitoring and sensors for parameters such as heart rate and blood pressure.

There is an increasing importance in wireless and mobile communications in industrial applications. A cost of installation and maintenance of wiring is high. Thus, a possibility of replacing cables with reconfigurable wireless links is an attractive opportunity in many industries. However, achievement of this requires that wireless connection should operate with latency, reliability and a capacity similar to those of a cable and management of the wireless connection should be simplified. Low latency and very low error probability are new requisites for a need of 5G connection.

Logistics and freight tracking are important use cases of mobile communications that enable to track inventory and packages in any place using a location-based information system. Use cases of logistics and freight tracking generally require low data transmission rates, but also need a wide range of reliable location information.

The present disclosure to be described hereinafter may be implemented by combining or changing respective embodiments to satisfy requirements for the aforementioned 5G technology.

FIG. 1A is a conceptual diagram illustrating an embodiment of an artificial intelligence (AI) apparatus.

Referring to FIG. 1A, in an AI system, at least one from among an AI server 16, a robot 11, and an autonomous vehicle 12, an extended reality (XR) device 13, a smartphone 14, and a home appliance 15 is connected to a cloud network. Here, the robot 11, the autonomous vehicle 12, the XR device 13, the smartphone 14, the home appliance 15, or the like to which AI technology is applied may be referred to as AI devices 11 to 15.

The cloud network 10 may mean a network constituting a part of a could computing infrastructure or present in the cloud computing infrastructure. Here, the cloud network 10 may be configured using a third generation (3G) network, a fourth generation (4G) or long-term evolution (LTE) network, a 5G network, etc.

That is, respective devices 11 to 16 constituting the AI system may be connected to each other via the cloud network 10. Particularly, the respective devices 11 to 16 may communicate with each other via a base station or directly without a base station.

The device 16, i.e., an AI server may include a server configured to perform AI processing or a server configured to perform an operation on big data.

The AI server 16 may be connected, via the cloud network 10, to at least one from among the robot 11, and the autonomous vehicle 12, the XR device 13, the smartphone 14, and the home appliance 15 which are the AI devices constituting the AI system, and help to perform at least part of AI processing of the connected AI devices 11 to 15.

The AI server 16 may learn an artificial neural network to learn according to a machine learning algorithm instead of the AI devices 11 to 15, and directly store a learning model or transmit the learning model to the AI device 11 to 15.

In this case, the AI server 16 may receive input data from the AI device 11 to 15, infer a resultant value with respect to the received input data using the leaning model, and generate a response or a control command based on the inferred resultant value to transmit the response or the control command to the AI device 11 to 15.

Alternatively, the AI device 11 to 15 may infer a resultant value with respect to input data directly using the leaning model, and generate a response or a control command based on the inferred resultant value. <AI+XR>

As AI technology is applied to the XR device 13, the XR device 13 may be implemented as a head-mount display (HMD), a head-up display (HUD) equipped in a vehicle, a television, a cellular phone, a smartphone, a computer, a wearable device, a home appliance, digital signage, a vehicle, a fixed robot, a mobile robot, or the like.

The XR device 13 may generate position data and attribute data with respect to three-dimensional (3D) points by analyzing 3D point cloud data or image data each obtained via various sensors or from an external device. The XR device 13 may obtain information regarding a peripheral space or a real object, and render an XR object to output the XR object. For example, the XR device 13 may output an XR object including additional information regarding a recognized object by corresponding the XR object to the recognized object.

The XR device 13 may perform the above-described operations using a learning model configured as at least one artificial neural network. For example, the XR device 13 may recognize a real object from 3D point cloud data or image data using a learning model, and provide information corresponding to the recognized real object. Here, the learning model may be learned directly from the XR device 13 or from an external device such as the AI server 16, etc.

In this case, the XR device 13 may not only perform operation by generating a result directly using the learning model, but also perform an operation by transmitting sensor information to the external device such as the AI server 16, etc. and receiving a result generated accordingly.
<AI+Robot+XR>

As AI technology and XR technology are applied to the robot 11, the robot 11 may be implemented as a guide robot, a transport robot, a cleaning robot, a wearable robot, an entertainment robot, a pet robot, an unmanned aircraft robot, a drone, or the like.

The robot 11 to which the XR technology is applied may mean a robot that is a target of control/interaction in an XR image. In this case, the robot 11 is distinguished from the XR device 13, and may interoperate with the XR device 13.

When the robot 11 that is a target of control/interaction in the XR image obtains sensor information from sensors including a camera, the robot 11 or the XR device 13 may generate an XR image based on the sensor information, and the XR device 13 may output the generated XR image. In addition, the robot 11 may operate based on a control signal input via the XR device 13 or interaction with a user.

For example. the user may check an XR image corresponding to a view point of the robot 11 remotely interoperated through an external device such as an external device such as the XR device 13, etc., and adjust an autonomous driving path of the robot 11 through the interoperation, or control operation or driving, or identify information about a peripheral object.

<AI+Autonomous Driving+XR>

As AI technology and XR technology are applied to the autonomous vehicle 12, the autonomous vehicle 12 may be implemented as a mobile robot, a vehicle, an unmanned aircraft robot, etc.

The autonomous vehicle 12 to which the XR technology is applied may mean an autonomous vehicle including an element configured to provide an XR image, an autonomous vehicle that is a target of control/interaction in the XR image, or the like. Particularly, the autonomous vehicle 12 that is a target of control/interaction in the XR image may be distinguished from the XR device 13, and interoperate with the XR device 13.

The autonomous vehicle 12 including the element configured to provide an XR image may obtain sensor information from sensors including a camera, and output a generated XR image based on the obtained sensor information. For example, the autonomous vehicle 12 includes an HUD to output an XR image to provide a passenger with an XR object corresponding to a real object or an object in a screen.

In this case, when the XR object is output to the HUD, at least a part of the XR object may be output to overlap a substantial object toward which a gaze of a passenger is directed. On the other hand, when an XR object is output to a display included in the autonomous vehicle 12, at least a part of the XR object may be output to overlap an object in a screen. For example, the autonomous vehicle 12 may output XR objects corresponding to objects such as a road, other vehicles, a traffic light, a traffic sign, a two-wheeled vehicle, a pedestrian, a building, etc.

When the autonomous vehicle 12 that is a target of control/interaction in the XR image obtains sensor information from sensors including a camera, the autonomous vehicle 12 or the XR device 13 may generate an XR image based on the sensor information, and the XR device 13 may output the generated XR image. In addition, the autonomous vehicle 12 may operate based on a control signal input via an external device such as the XR device 13, etc. or based on interaction with a user.

[Extended Reality Technology]

Extended reality (XR) is a generic term for virtual reality (VR), augmented reality (AR), and mixed reality (MR). VR technology provides only computer graphic (CG) images of objects, backgrounds, or the like in a real world. AR technology provides virtual CG images over images of real objects. MR technology is a computer graphic technology for mixing and combining virtual objects with a real world.

The MR technology is similar to the AR technology in that real objects and virtual objects are shown together. However, the MR technology is different from the AR technology in that a virtual object is used in a form of complementing a real object in the AR technology, whereas a virtual object and a real object have equivalent characteristics in the MR technology.

The XR technology may be applied to a head-mount display (HMD), a head-up display (HUD), a mobile phone, a tablet PC, a laptop computer, a desktop computer, a TV, digital signage, etc. A device to which the XR technology is applied may be referred to as an XR device.

Figure 1B:
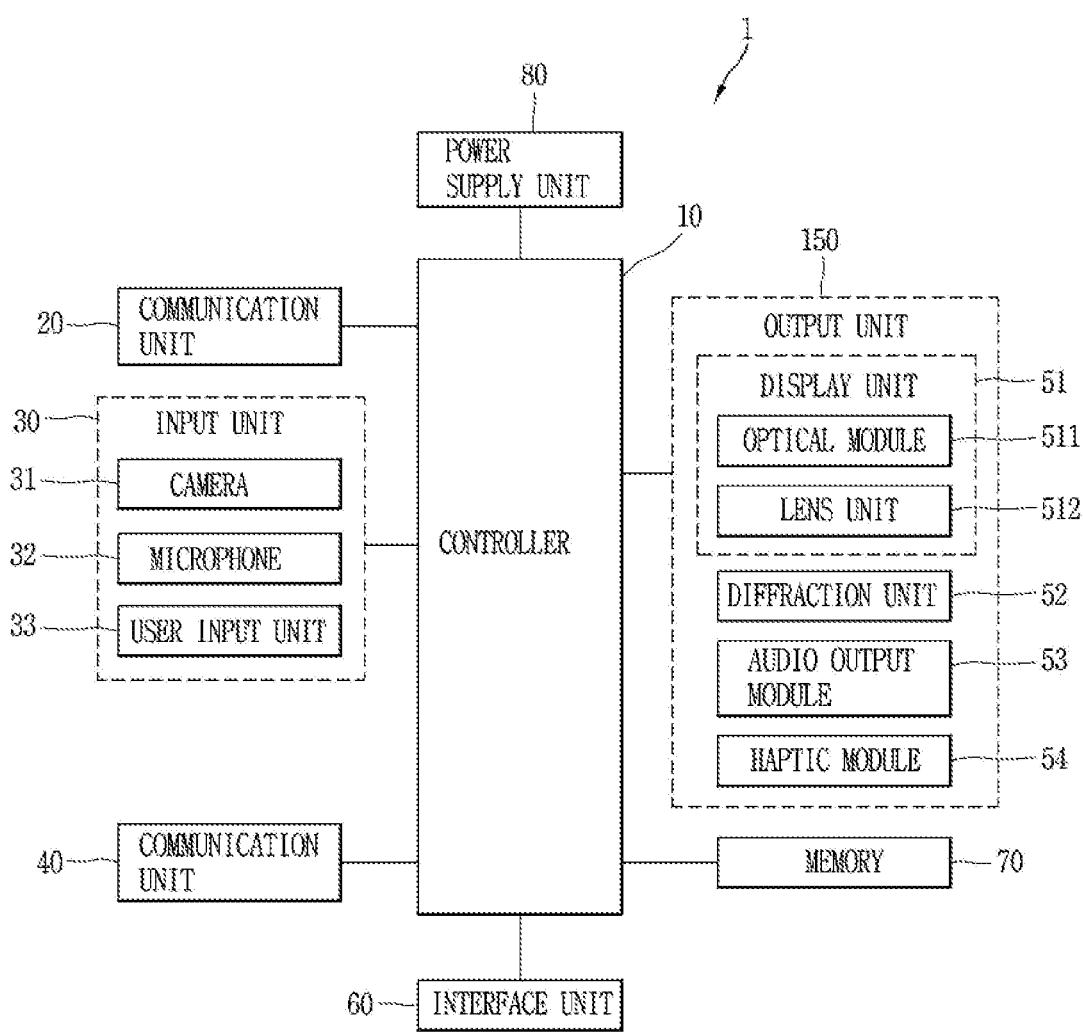
FIG. 1B is a block diagram of a configuration of a spectacle-type terminal device related to the present disclosure.

FIG. 1B is a block diagram of a configuration of a spectacle-type terminal device 1 related to the present disclosure.

The spectacle-type terminal device 1 according to an embodiment of the present disclosure may include a communication unit 20, an input unit 30, a sensor unit 40, an output unit 150, an interface unit 60, a memory 70, a controller 10, a power supply unit 80, etc. FIG. 1 shows the spectacle-type terminal device 1 having various components, but it may be understood that implementing all of the illustrated components is not a requirement. Greater or fewer components may alternatively be implemented.

In more detail, among those components, the communication unit 20 may typically include one or more modules which permit communications such as wireless communications between the spectacle-type terminal device 1 and a wireless communication system, communications between the spectacle-type terminal device 1 and another spectacle-type terminal, or communications between the spectacle-type terminal device 1 and an external server. Further, the communication unit 20 may typically include one or more modules which connect the spectacle-type terminal device 1 to one or more networks. The communication unit 20 may include one or more of a broadcast receiving module, a mobile communication module, a wireless Internet module, a short-range communication module, and a location information module.

The input unit 30 may include a camera 31 or an image input unit for obtaining images or video, a microphone 32, which is one type of audio input device for inputting an audio signal, and a user input unit 33 (for example, a touch key, a mechanical key, and the like) for allowing a user to input information. Data (for example, audio, video, image, and the like) may be obtained by the input unit 30 and may be analyzed and processed according to user commands.

A camera 31 may be provided by at least one in number that is disposed adjacent to at least one of the left eye and the right eye, to capture (take, photograph) an image of a front side. Since the camera 31 is disposed adjacent to the eye, the camera 121 may acquire a scene viewed by the user as an image. In addition, the camera 31 may be disposed on a glass frame supporting the glass to obtain an image of an inside of the glass. In this case, the camera 31 may also obtain information related to the shape of both eyes of the user, that is, the size of both eyes or the position of each pupil, from the image of the inside of the glass.

The sensor unit 40 may typically be implemented using one or more sensors configured to sense internal information of the spectacle-type terminal device 1, the surrounding environment of the spectacle-type terminal device 1, user information, and the like. For example, the sensor unit 40 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 31), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The spectacle-type terminal device 1 disclosed herein may be configured to utilize information obtained from one or more sensors, and combinations thereof.

The output unit 50 may typically be configured to output various types of information, such as audio, video, tactile output, and the like. The output unit 150 may be shown having at least one of a display 51, an audio output module 53, and a haptic module 54. The output unit 50 may further include an optical output module for outputting an optical signal.

Here, the display unit 51 may include an optical module 511 including at least one light source configured to emit light for generating a virtual image as an image source. The optical module 511 may include various light sources. As an example, the optical module 511 may use a micro light-emitting diode (LED), a micro organic LED (OLED), or liquid crystal on silicon (LCoS) each configured to emit light having a wider light-emission wavelength than that of a laser diode, instead of a laser display using the laser diode. Alternatively, a digital micro-mirror device (DMD) with an LED or a super luminescent diode (SLD) may be included as an image source.

In addition, the display unit 51 may include a lens unit 512 including at least one lens configured to expand and convert light emitted from the optical module 511 into parallel light. The at least one lens included in the lens unit 512 may include at least one from among a concave lens, a convex lens, and a collimating lens. The concave lens and the convex lens emit and expand light output from the optical module 511. The collimating lens may be used to convert light emitted and expanded from the concave lens and the convex lens into parallel light.

The spectacle-type terminal device 1 according to an embodiment of the present disclosure may further include a diffraction unit 52 configured to define an optical path in which light output from the display unit 51 proceeds toward an eye movement box (EMB) provided on glass of the spectacle-type terminal device 1. As an example, when the output unit 50 is included in a body portion provided in a leg portion of the spectacle-type terminal device 1, the diffraction unit 52 may define an optical path in which light is projected on the glass from a part of the body portion.

The diffraction unit 52 may include the diffraction unit 52 including at least one diffraction element. The diffraction unit 52 may include a refraction element configured to refract light output from the display unit 51 toward a particular direction.

In addition, the glass may include a reflection element 301 configured to provide the EMB in at least a part of the glass. In this case, light output from the display unit 51 is refracted through a refraction element and projected onto the reflection element 301, and the projected light is reflected onto the reflection element 301. Thus, a virtual image identifiable by a user may be provided onto the reflection element 301.

Here, the reflection element 301 provided on the glass may be provided as a holographic optical element (HOE). In this case, the HOE 301 may be an element provided to transmit light incident within a preset range of incident angles, and reflect light with an incident angle outside the preset range of incident angles. In this case, a virtual image may be provided by transmitting light incident in a direction vertical to a pupil of a user and reflecting light refracted through the refraction element to display a virtual image having a see-through form on the glass.

The refraction element may be provided as one refraction element or a plurality of reflection elements configured to refract light output from the display 51. In this case, the reflection elements may provide an optical path in which light output from the display unit 51, i.e., the lens unit 512 is directed toward the holographic optical element 301. To do so, a first reflection element 303 among the reflection elements may be provided to reflect light output from the display unit 51, and a second reflection element 302 other than the first reflection element 303 may be arranged to reflect light, reflected from the first reflection element 302, onto the holographic optical element 301.

As described above, a holographic optical element has characteristics of transmitting light incident within a preset range of incident angles and reflecting light with an incident angle outside the preset range of incident angles. Accordingly, when the second reflection element 302 is arranged as a holographic optical element and the second reflection element 302 (a holographic optical element) is arranged between the first reflection element 303 and the display unit 51, an incident angle of light may be adjusted so that light output from the display 51 penetrates through the second reflection element 302 to be incident on the first reflection element 303, and light reflected by the first reflection element 303 is reflected by the second reflection element 302.

Accordingly, a required size of the diffraction unit 52 may be reduced through overlapping of optical paths by overlapping a first path in which light is incident from the display unit 51 on the first reflection element 303 with a second path in which light reflected through the first reflection element 303 is incident on the second reflection element 302.

Hereinafter, to distinguish the hologram optical element 301 included on the glass from a hologram optical element used as the second reflection element 302, a former element, i.e., the hologram optical element 301 included on the glass is referred to as the first hologram optical element (a first HOE) 301 and a latter element, i.e., a hologram optical element used as the second reflection element 302 is referred to as a second hologram optical element (a second HOE) 302.

The interface unit 160 serves as an interface with various types of external devices that are coupled to the spectacle-type terminal device 1. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the spectacle-type terminal device 1 may perform assorted control functions related to a connected external device, in response to the external device being connected to the interface unit 60.

The audio output module 53 may receive audio data from the wireless communication unit 20 or output audio data stored in the memory 170 during modes such as a signal reception mode, a call mode, a record mode, a voice recognition mode, a broadcast reception mode, and the like. The audio output module 53 may output audio signals related to functions performed in the spectacle-type terminal device 1. The audio output module 53 may also be implemented as a receiver, a speaker, a buzzer, or the like.

The audio output module 53 may be configured to transmit sound in a general sound output manner or a bone-conduction mode. In case where the audio output module 53 is implemented in the bone-conduction manner, when the user wears the spectacle-type terminal device 1, the audio output module 53 is brought into close contact with the user's head and vibrates a skull to transmit sound.

The haptic module 54 may generate various tactile effects that the user feels, perceives, or otherwise experiences. A typical example of a tactile effect generated by the haptic module 54 is vibration. The strength, pattern and the like of the vibration generated by the haptic module 54 can be controlled by user selection or setting by the controller. In addition, the haptic module 54 may output different types of vibration by combining them or in a sequential manner, and may be provided by two or more in number depending on the configuration of the spectacle-type terminal device 1.

The interface unit 60 serves as an interface for external devices to be connected with the spectacle-type terminal device 1. For example, the interface unit 60 can receive data transmitted from an external device, receive power to transfer to elements and components within the spectacle-type terminal device 1, or transmit internal data of the spectacle-type terminal device 1 to such external device. The interface unit 60 may include wired or wireless headset ports, external power supply ports, wired or wireless data ports, memory card ports, ports for connecting a device having an identification module, audio input/output (I/O) ports, video I/O ports, earphone ports, or the like.

The memory 70 may store programs to support operations of the controller 10 and store input/output data (for example, phonebook, messages, still images, videos, etc.). The memory 70 may store data related to various patterns of vibrations and audio which are output through the haptic module 54 or the audio output module 53.

The controller 10 typically functions to control an overall operation of the mobile terminal device 1, in addition to the operations associated with the application programs. For example, the controller 10 may set or release a lock state for restricting a user from inputting a control command with respect to applications when a status of the spectacle-type terminal device 1 meets a preset condition.

In addition, the controller 10 may perform control and processing related to voice calls, data communications, video calls, and the like. In addition, the controller 10 can control one or a combination of those components in order to implement various exemplary embodiments disclosed herein.

The power supply unit 80 receives external power or provides internal power and supply the appropriate power required for operating respective elements and components included in the HMD 100 under the control of the controller 10. The power supply unit 80 may include a battery, which is typically rechargeable or be detachably coupled to the terminal body for charging. In addition, the battery may be charged using power supplied from an external charger via a connection port, or using an inductive coupling method based on a magnetic inductive phenomenon or based on an electromagnetic resonance phenomenon from an external wireless power transmission device.

The XR device 13 of FIG. 1A may be configured to receive content from a mobile terminal device such as the smartphone 14 and display a virtual image corresponding to image light on a lens of a spectacle-type terminal device. In relation to this, the spectacle-type terminal device 1 of FIG. 1B may be configured to receive content from a mobile terminal device via the communication unit 20 and display a virtual image corresponding to image light on the lens unit 512 of the display unit 51.

Hereinafter, a micro display-based holographic optical element (HOE) structure proposed herein is described in comparison with a laser diode-based HOE structure. In relation to this, FIG. 2 illustrates the laser diode-based HOE structure and the micro display-based HOE structure.

Figure 2:
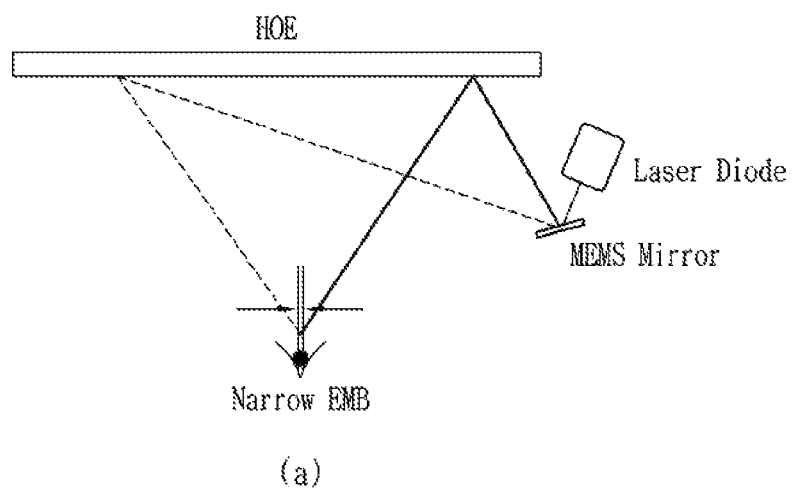
FIG. 2 illustrates a laser diode-based holographic optical element (HOE) structure and a micro display-based HOE structure.
Figure 2:
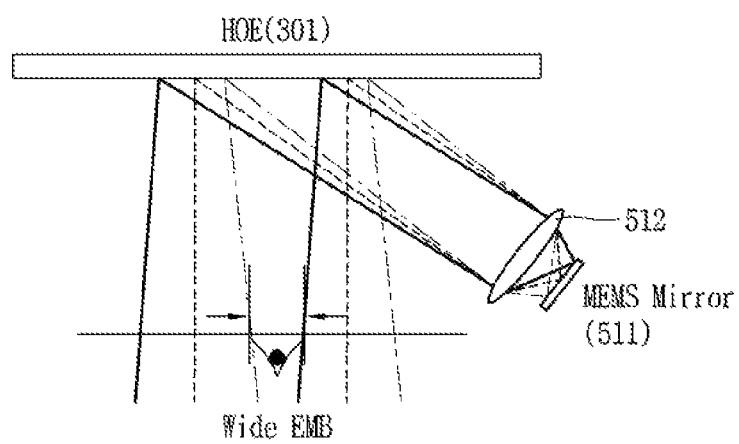

Referring to (a) of FIG. 2, the laser diode-based HOE structure may be referred to as a reflection-type HOE structure using a laser scanning method. In the reflection-type HOE structure using a laser scanning method, light from various angles is concentrated on one point. Accordingly, in the reflection-type HOE structure using a laser scanning method, an eye needs to kept on an area in which light is concentrated on one point to view an image. Accordingly, in the reflection-type HOE structure using a laser scanning method, a field of view (FOV) may be widely provided, but an image may not be viewed even when a position of an eye is slightly moved.

In other words, the reflection-type HOE structure using a laser scanning method provides a narrow EMB. Thus, when a person is located in a different inter pupil distance (IPD) or when a spectacle wearing state is changed in an active environment even though an IPD is suited to a user, an image may not be viewed.

Accordingly, in a structure proposed in (b) of FIG. 2, parallel light or emissive light is induced by an optical engine and reflected onto an HOE to expand an EMB. Referring to (b) of FIG. 2, an optical structure may be configured to include a display 511, i.e., a micro display, the lens unit 512, and a HOE 300. Image light emitted via the display 511 may be provided as parallel light or emissive light through the lens unit 512. Parallel light or emissive light provided through the lens unit 512 may be configured to be diffracted through the HOE 300 to expand the EMB.

Figure 3A:
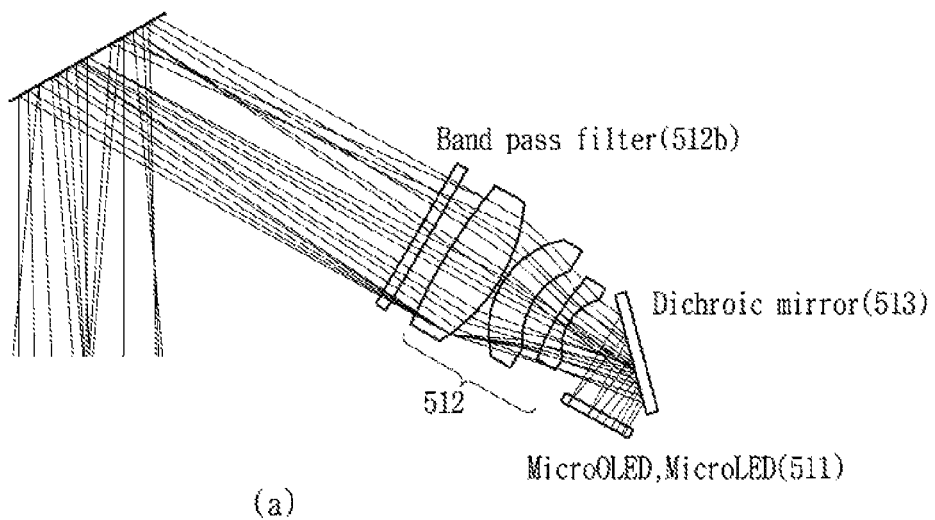
FIGS. 3A to 3C illustrate HOE structures using a self-emission method, an illumination light method, and a laser beam scanner (LBS) method, respectively.
Figure 3A:
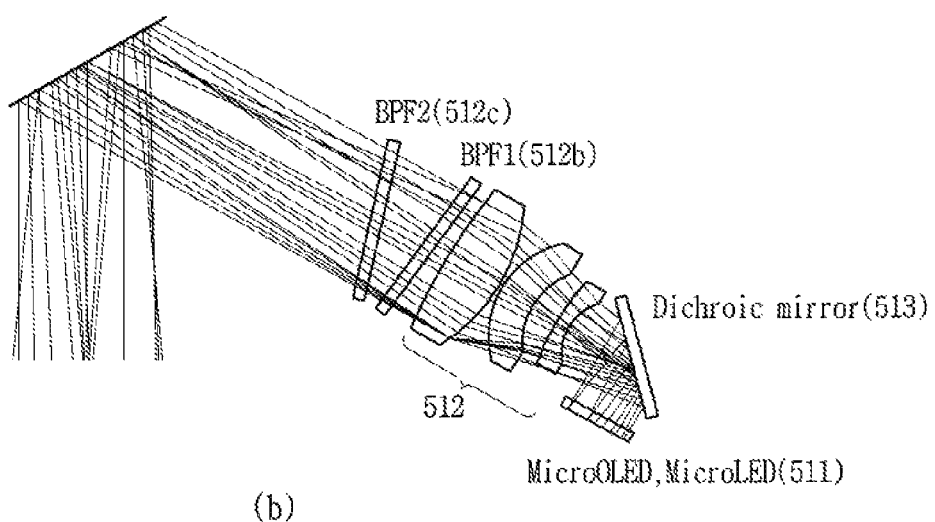
Figure 3B:
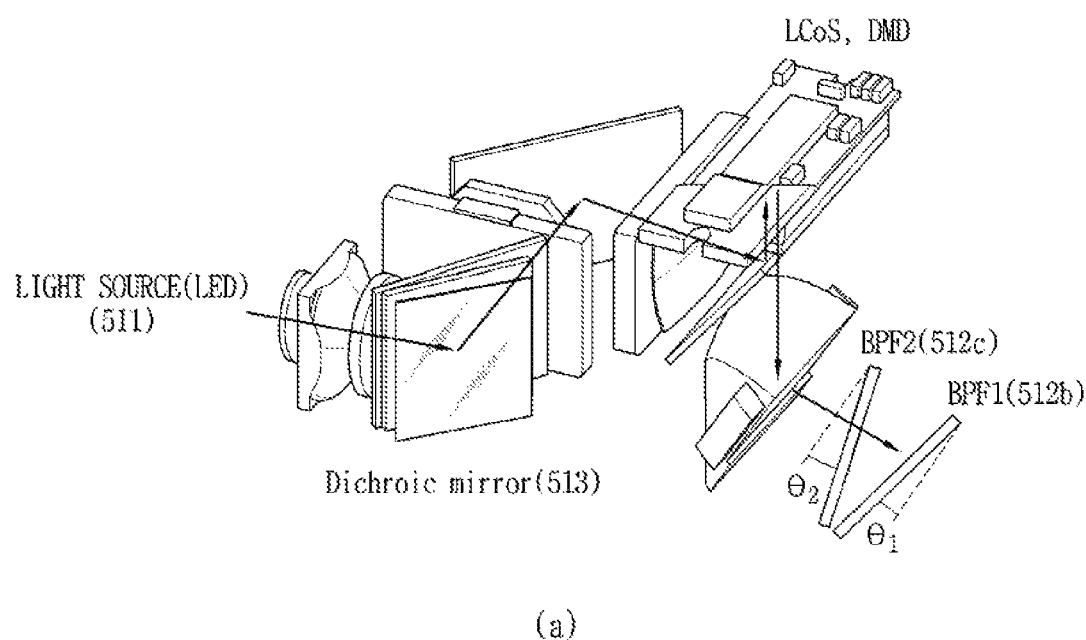
Figure 3B:
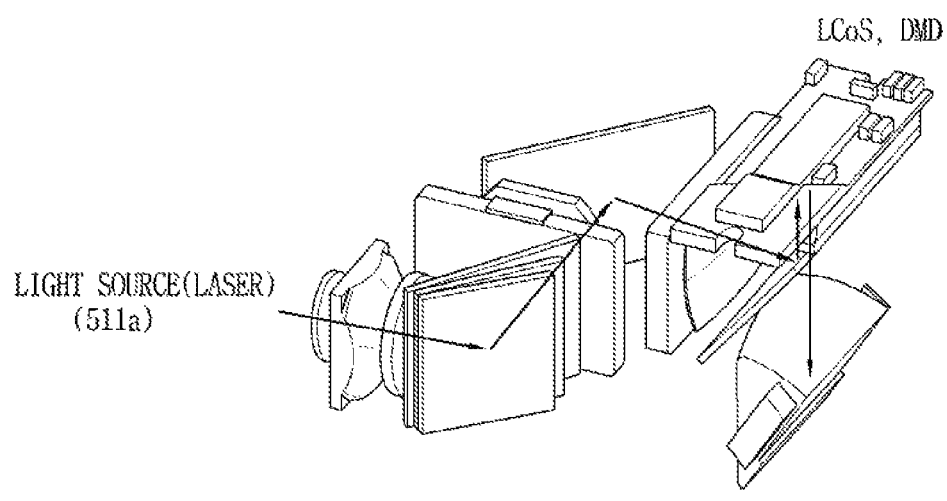
Figure 3C:
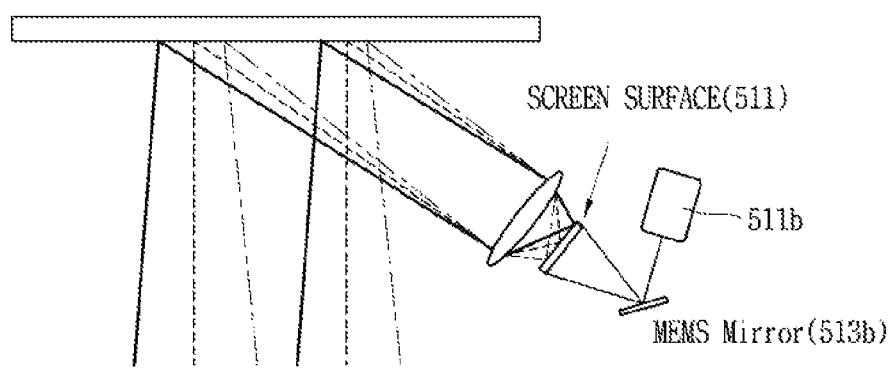

An optical structure in which an optical engine may induce parallel light or emissive light may be configured as shown in FIGS. 3A to 3C. FIGS. 3A to 3C illustrate HOE structures using a self-emission method, an illumination light method, and a laser beam scanner (LBS) method, respectively.

Referring to FIG. 3A, a MicroOLED or a MicroLED to which a dichroic mirror 513 and band pass filters 512b and 512c are applied may be configured as the display unit 51. Referring to FIG. 3B, the display 511 implemented as one of a digital mirror device (DMD) and liquid crystal on silicon (LCOS) using an illumination light method may be applied. Referring to FIG. 3C. an optical structure may be configured using a laser beam scanner (LBS).

Referring to (a) of FIG. 3A, an optical structure may include the display 511, the dichroic mirror 513, and the band pass filter 512b. The lens unit 512 including a plurality of lenses may be arranged between the dichroic mirror 513 and the band pass filter 512b. In relation to this, when a light source with a large wavelength width is used, image sharpness may deteriorate due to the large wavelength width. Accordingly, a sharp image may be obtained by reducing an operating wavelength band of a light source using the dichroic mirror 513 and/or the band pass filter 512b. In relation to this, when a wavelength width is small, a sharp image may be obtained. However, it may not be easy to configure a band pass filter providing a great bandwidth. In addition, as illustrated in (a) of FIG. 3A, the band pass filter (BPF) 512b is arranged in parallel with a travel direction of light, the light is reflected from the BPF 512b back onto inside of an optical engine 511 or 512. Due to the reflected light, a duplicated image may be provided.

Accordingly, as illustrated in (b) of FIG. 3A, first and second band pass filters 512b and 512c may be configured to be arranged at different angles to prevent a duplicated image from being caused by the reflected light. In this case, the band pass filters 512b and 512c, i.e., first and second band pass filters may be configured to have different bandwidths.

Referring to (b) of FIG. 3A, an optical structure may include the display 511, the dichroic mirror 513, and the band pass filters 512b and 512c. The lens unit 512 including a plurality of lenses may be arranged between the dichroic mirror 513 and the first band pass filter 512b. In relation to this, when a light source having a large wavelength width is used, image sharpness may deteriorate due to the large wavelength width. Accordingly, a sharp image may be obtained by reducing an operating wavelength band of a light source using the dichroic mirror 513 and/or the band pass filters 512b and 512c. In detail, as respective bandwidths of the first and second band pass filters 512b and 512c are configured to be smaller than a bandwidth of the BPF 512b shown in (a) of FIG. 3A, a sharp image may be obtained. In addition, light may be suppressed from proceeding back into an optical engine, by configuring arrangement angles of the first and second band pass filters 512b and 512c to be different from each other not to be vertical to a travel direction of the light. As another example, an optical structure may be provided by combining at least one dichroic mirror with a BPF.

Referring to FIG. 3B, the display 511 implemented as one of a digital mirror device (DMD) and liquid crystal on silicon (LCOS) using an illumination light method may be applied. When the display 511, i.e., a light source having a large wavelength band like an LED is used, the BPFs 512b and 512c and the dichroic mirror 513 may be used to reduce a bandwidth as illustrated in (a) of FIG. 3B, similarly to the self-emission method. As another example, referring to (b) of FIG. 3B, a laser diode 511a having a small wavelength width may be applied as a light source.

As described above, referring to FIG. 3C. an optical structure may be configured using a laser beam scanner (LBS). In this case, an optical engine other than the display 511 may be configured as a laser beam scanner 511b.

Since parallel light or emissive light may not be induced through a MEMS mirror 513b, a screen surface may be provided using the display 511 having a surface light source, such as a MicroOLED, on an upper region of the MEMS mirror 513b. In addition, an optical engine configured to generate parallel light or emissive light may be configured as the laser beam scanner 511b.

Figure 4:
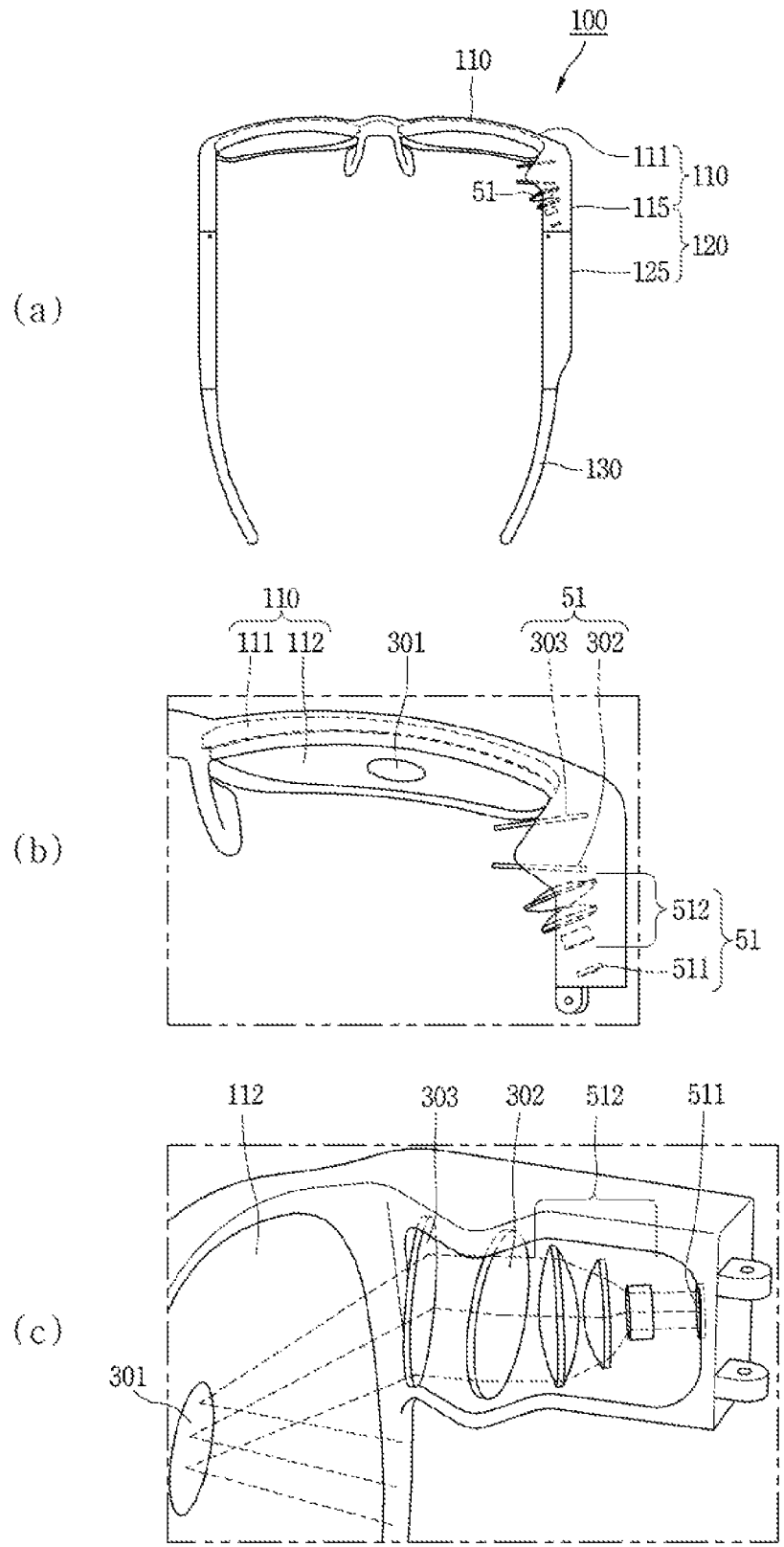
FIG. 4 illustrates configurations of the spectacle-type terminal device related to the present disclosure, and an internal structure of a display unit and a diffraction unit each included in a body portion.

FIG. 4 illustrates configurations of the spectacle-type terminal device 1 related to the present disclosure, and an internal structure of the display unit 51 and the diffraction unit 52 each included in the body portion 120.

First, (a) of FIG. 4 illustrates the spectacle-type terminal device 1 according to an embodiment of the present disclosure.

The spectacle-type terminal device 1 is configured to be wearable on a head portion of a human body, and may include a frame portion (a case, a housing, etc.) to obtain such a configuration. The frame may be formed of a flexible material to facilitate wearing. The frame may include a first frame 110 supporting each glass and a second frame 130 supporting a main body of the spectacle-type terminal device 1.

The second frame 130 includes a leg portion (or a leg unit) of the spectacle-type terminal device 1 and is supported by a head portion of a human body. The second frame 130 may provide a space in which a body portion 115 and a temple body 125 both equipped with various parts are included. In addition, the space in the second frame 130 may be equipped with the temple body 125.

The first frame 110 is provided integrally to include the body portion 115, and thus, may be referred to as a front body portion 110. Accordingly, the front body portion 110 may be configured to include a front frame 111 and the body portion 115 provided integrally with the front frame 111.

The front body portion 110 may include glass 112 including a lens covering at least one of left and right eyes, and a glass frame 111 provided to support and fix the glass 112. Accordingly, the front surface frame 111 may be referred to as the glass frame 111. The glass 112 may be detachably mounted in the glass frame 111.

The body portion 115 in the front body portion 110 may be configured to be folded at a certain angle relative to the temple body 125, but is not limited thereto. Various electronic parts in the temple body portion 125 may be electronic parts corresponding to the respective components of FIG. 1B. Accordingly, the temple body portion 125 may include the controller 10, the communication unit 20 connected to the controller 10, the input unit 30, the sensor unit 40, and the memory 70, as well as the output unit 50. On the other hand, the display unit 51 and the diffraction unit 52 both configured to output light to display a virtual image on the glass 112 may be included in the body portion 115. In addition, an optical path in which light is projected on the glass 122 adjacent to the display unit 51 via the diffraction unit 52 may be provided by the body portion 115.

(b) and (c) of FIG. 4 illustrate examples of a configuration of the display 51 and the diffraction unit 52 both included in the body portion 115.

(b) and (c) of FIG. 4 illustrate the display unit 51 including a light source configured to output an image source, i.e., the optical module 511 and the lens unit 512 including a plurality of lenses. In addition, a configuration of the diffraction unit 52 including the first reflection element 303, the second reflection element 302, and the first hologram optical element 301 is illustrated.

In relation to this, in the spectacle-type terminal device 1 according to an embodiment of the present disclosure, the first hologram optical element 301 may be provided in one region of the glass 112. In this case, the one region of the glass 112 in which the first hologram optical element 301 is provided is a region in which light transmitted through the diffraction unit 52 is reflected to display a virtual image. That is, a region of a displayed virtual image viewable by eyes of a user, i.e., an eye movement box (EMB) may be provided.

As illustrated in (b) and (c) of FIG. 4, in the spectacle-type terminal device 1 according to an embodiment of the present disclosure, the first reflection element 303 and the second reflection element 302 may be arranged between the lens unit 512 in the display unit 51 and the first hologram optical element 301.

Here, the second reflection element 302 may be a hologram optical element (a second hologram optical element) as described above. Thus, hereinafter, a description will be provided on an assumption that the second reflection element 302 is the second hologram optical element.

The first reflection element 303 may be a full-reflection mirror configured to reflect light in all wavelengths and a half-reflection mirror provided to reflect light. In relation to this, the half-reflection mirror may be configured not to have wavelength selectivity. The half-reflection mirror may be a half-transmission mirror configured to partially limit reflection of beams of incident light so that the beams of incident light have a certain transmission rate and a certain reflection rate within a constant range. According to another example, the half-reflection mirror may be configured to partially reflect light within a preset wavelength range.

When the first reflection element 303 is provided as the half-reflection mirror, the first reflection mirror 303 may reflect light of a certain rate onto the second hologram optical element 302. According to an embodiment, light corresponding to noise generated in a light expanding and converting process performed by the lens unit 512, i.e., light noise may not be reflected onto the first reflection element 303. Accordingly, a virtual image according to light from an image source in which light noise is removed may be displayed via the first hologram optical element 301.

However, as such, when the first reflection element 303 is provided as the half-reflection mirror, the light may be reflected. According to an embodiment, when beams of light within a preset wavelength range are reflected, light noise may be removed, but a minute optical error such as a quantization error may be present between the respective beams of light having different wavelengths. Accordingly, the first reflection element 303 may be configured using a half-transmission mirror that does not have wavelength selectivity but has a certain transmission rate and a certain reflection rate of light within a constant range.

On the other hand, when the first reflection element 303 is provided as a full-reflection mirror, incident light in all wavelengths are reflected onto the second hologram optical element 302. Accordingly, a virtual image according to light itself output from an image source may be displayed via the first hologram optical element 301. Accordingly, an optical error may not occur. However, since light in all wavelengths are all reflected due to characteristics of the full-reflection mirror, light noise generated in a light expanding and converting process performed by the lens unit 512 may be included in the virtual image.

Figure 5A:
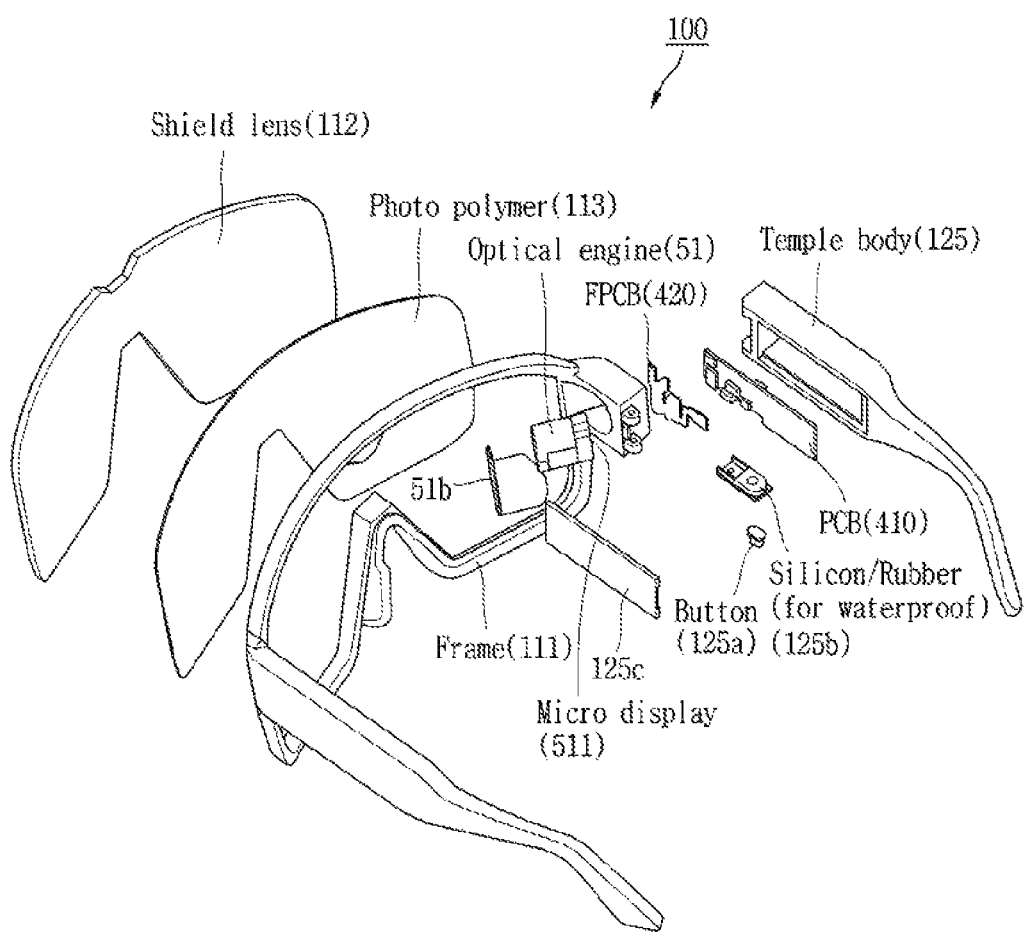
FIG. 5A illustrates an exploded perspective view of the spectacle-type terminal device arranged in a temple body portion.
Figure 5B:
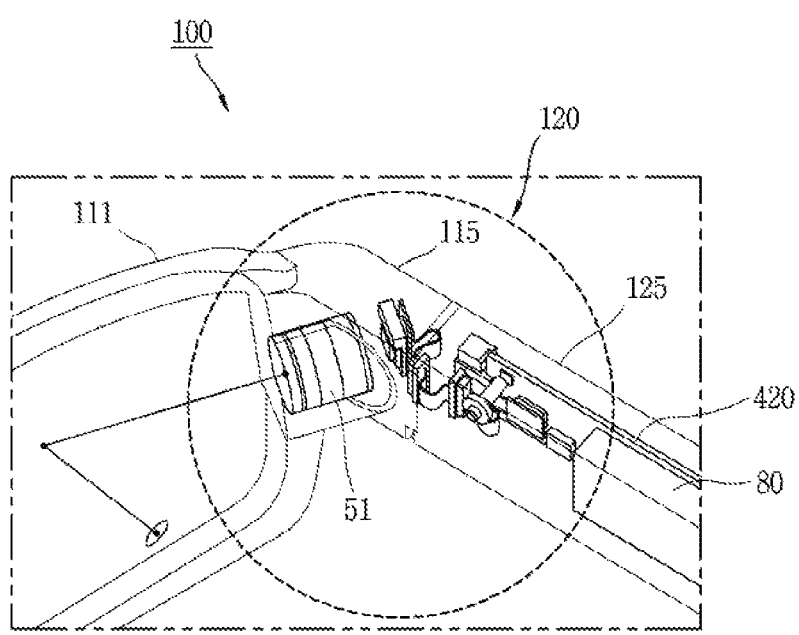
FIG. 5B illustrates an enlarged view of an internal structure of a front body portion and the temple body portion of the spectacle-type terminal device of FIG. 5A.

FIG. 5A illustrates an exploded perspective view of the spectacle-type terminal device arranged in a temple body portion. FIG. 5B illustrates an enlarged view of an internal structure of a front body portion and the temple body portion of the spectacle-type terminal device of FIG. 5A.

Referring to FIGS. 5A and 5B, a glass structure may be configured such that a photopolymer 113 is arranged on an inner side of a shield lens 112 or in the shield lens 112. When the photopolymer 113 is arranged in the shield lens 112, the photopolymer 113 may be configured in a sandwich structure in the shield lens 112. A glass structure is a structure in which an image output from the optical engine 51 is diffracted into a pattern of the first HOE 301 of the photopolymer 113 to transmit an image to an eye.

The optical engine 51 is mounted into the body portion 115 provided integrally with the front frame 111 to receive an effect of force twisting the glass structure as little as possible when glasses is worn. In addition, a circuit portion including a printed circuit board (PCB) 410 and/or a flexible PCB (FPCB) 420, and the battery 80 may be configured to be arranged in the temple body portion 125 passing through a hinge portion 121. A size of the optical engine 51 may be reduced using the micro display MicroOLED 511.

A spectacle-type terminal device 100 may be configured such that the temple body portion 125 is folded from the body portion 115. In relation to this, FIG. 6 illustrates a state when a spectacle-type terminal device according to the present disclosure is folded and a state before the spectacle-type terminal device is folded.

Figure 6:
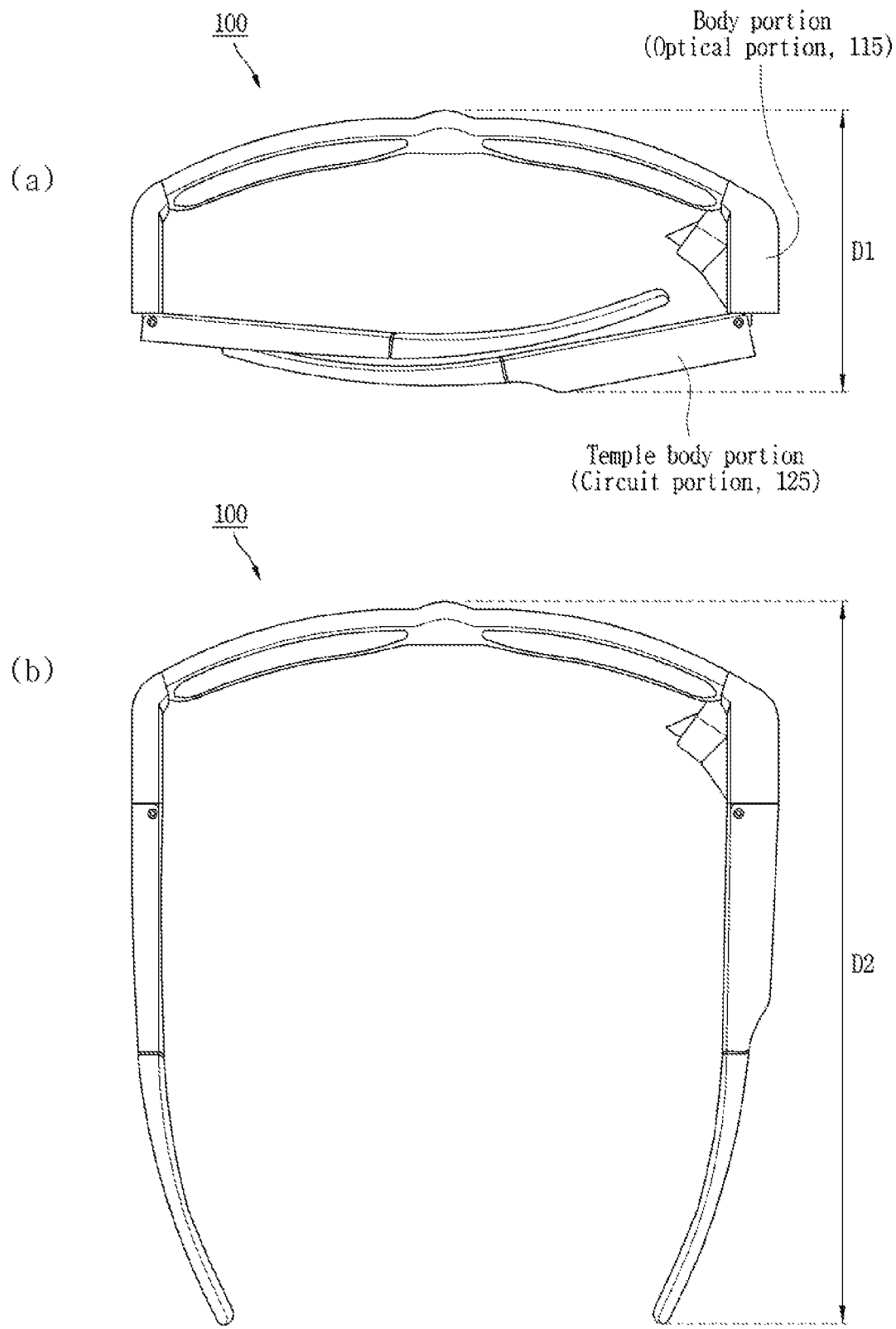
FIG. 6 illustrates a state when the spectacle-type terminal device according to the present disclosure is folded and a state before the spectacle-type terminal device is folded.

(a) of FIG. 6 illustrates an accommodation state of a spectacle-type terminal device 100 in which the temple body portion 125 is folded from the body portion 115. In this case, a configuration may be such that an optical portion is arranged in the body portion 115 and a circuit portion is arranged in the temple body portion 125. When the spectacle-type terminal device 100 is folded, a thickness D1 of the spectacle-type terminal device 100 may be configured to be within about 70 mm.

(b) of FIG. 6 illustrates a wearable state (e.g., a state before folding) of the spectacle-type terminal device 100 in which the temple body portion 125 is arranged to extend from the temple body portion 125 in a substantially identical direction. In the state before folding, a thickness of the spectacle-type terminal device 100 may be configured to have a value from about 174 mm within a certain range.

Referring to FIGS. 5A to 6, the spectacle-type terminal device 100 disclosed herein may be configured to include the lens 112, the front body portion 110, the optical engine 51, and the holographic optical element (HOE) 301. The optical engine 51 may be arranged in an internal region of the front body portion 110.

In addition, the spectacle-type terminal device 100 may further include the temple body portion 125. The PCB 410 and the battery 80 may be arranged in an internal region of the temple body portion 125.

Image data generated by the optical engine 51, i.e., an optical system to correspond to an AR image is emitted toward an eye of a user via the HOE 301 provided in the photopolymer 113. The front body portion 110 may be provided to support and fix the lens 112 and configured to be mounted with parts. As an example, the front body portion 110 may be configured such that the optical engine 51 and various optical parts are arranged. The optical engine 51 may be arranged in a region within the front body portion 110. The optical engine 51 may be configured to output image light which is an image source of a virtual image. The optical engine 51 may be configured to include the display 511 and a plurality of lenses each configured to output light having a certain wavelength band. A support member 51*b* provided to surround a partial region of the optical engine 51 may be arranged in the front body portion 110 to arrange the optical engine 51 to be fixed to the front body portion 110.

An optical element of the display 511 may include a liquid crystal on silicon (LCoS) element, a liquid crystal display (LCD) element, an organic light emitting diode (OLED) display element, a digital micromirror device (DMD), as well as a next-generation display element such as a micro LED, a quantum dot (QD) LED, or the like. As an example, the display 511 may be configured using a micro-OLED or a micro-LED.

As described above, the display 511 and the plurality of lenses may be configured to be in included in the optical engine 51. In addition, another HOE and a reflection element may be further included in the optical engine 51. At least one of another HOE and a reflection element may be arranged on one side surface of the support member 51*b*. In relation to this, an optical system structure according to the present disclosure will be described in detail with reference to FIG. 11.

The HOE 301 may be provided in at least a partial region of the photopolymer 113 provided on an inner surface or in an internal region of the lens 112. The HOE 301 may be provided in a partial region of the photopolymer 113 by diffracting image light and displaying display a virtual image corresponding to the image light. In relation to this, the HOE 301 may be configured such that a partial region of the photopolymer 113 is etched to have a certain shape. Accordingly, the HOE 301 may be configured in a certain shape to have direction selectivity and wavelength selectivity of incident light. The photopolymer 113 in which the HOE 301 is provided and the optical engine 51 may be arranged in the front body portion 110.

The temple body portion 125 may be configured to be coupled to the front body portion 110 by the hinge portion 121 to be folded at a certain angle with respect to the front body portion 110. The temple body portion 125 may be configured to accommodate parts therein and be coupled to a cover 125c.

The spectacle-type terminal device 100 may further include the body portion 115 and the FPCB 420 arranged in the temple body portion 125. The FPCB 420 may be electrically coupled to the optical engine 51, and arranged in the front body portion 110 and the temple body portion 125 to surround the hinge portion 121.

The spectacle-type terminal device 100 may further include the PCB 410 passing through the hinger portion 121 and arranged in the temple body portion 125. The PCB 410 may be electrically connected to the FPCB 420, and arranged to be erected at a certain angle in an internal region of the temple body portion 125 coupled to the hinge portion 121. The PCB 410 may be provided to have a certain length and a certain width, and various electronic parts may be arranged in the PCB 410.

The PCB 410 may not be arranged in the front body portion 110, but only in the temple body portion 125 to reduce a thickness of the spectacle-type terminal device when being folded as illustrated in (a) of FIG. 6.

The battery 80 is arranged between an inner region of the PCB 410 and an empty space of the temple body portion 125 so that the PCB 410 and the battery 80 are accommodated in the empty space of the temple body portion 125. The PCB 410 may be configured to receive power from the battery 80 and supply the power to the optical engine 51.

In a glass structure proposed herein, i.e., the spectacle-type terminal device, a main optical portion may be configured using the first frame portion 110 mounted with a shield lens, and a uni-body. Accordingly, a tolerance of an optical system and an error due to deformation may be minimized in the glass structure. To do so, the optical engine 51 is mounted in an internal region of the body portion 115 provided integrally with the front frame 111 of the front body portion 110. Accordingly, a location in which the optical engine 51 is arranged may be prevented from being changed due to force twisting a structure of the front body portion 110 when the spectacle-type terminal device is worn.

In addition, by applying the hinge portion 121 to an interface region between a region corresponding to an optical system and a foldable region, the spectacle-type terminal device 100 may be carried or kept in a folded state. A waterproof structure may be provided to prevent a liquid material from penetrating into an optical portion and a circuit portion when the spectacle-type terminal device 100 is folded.

Figure 7:
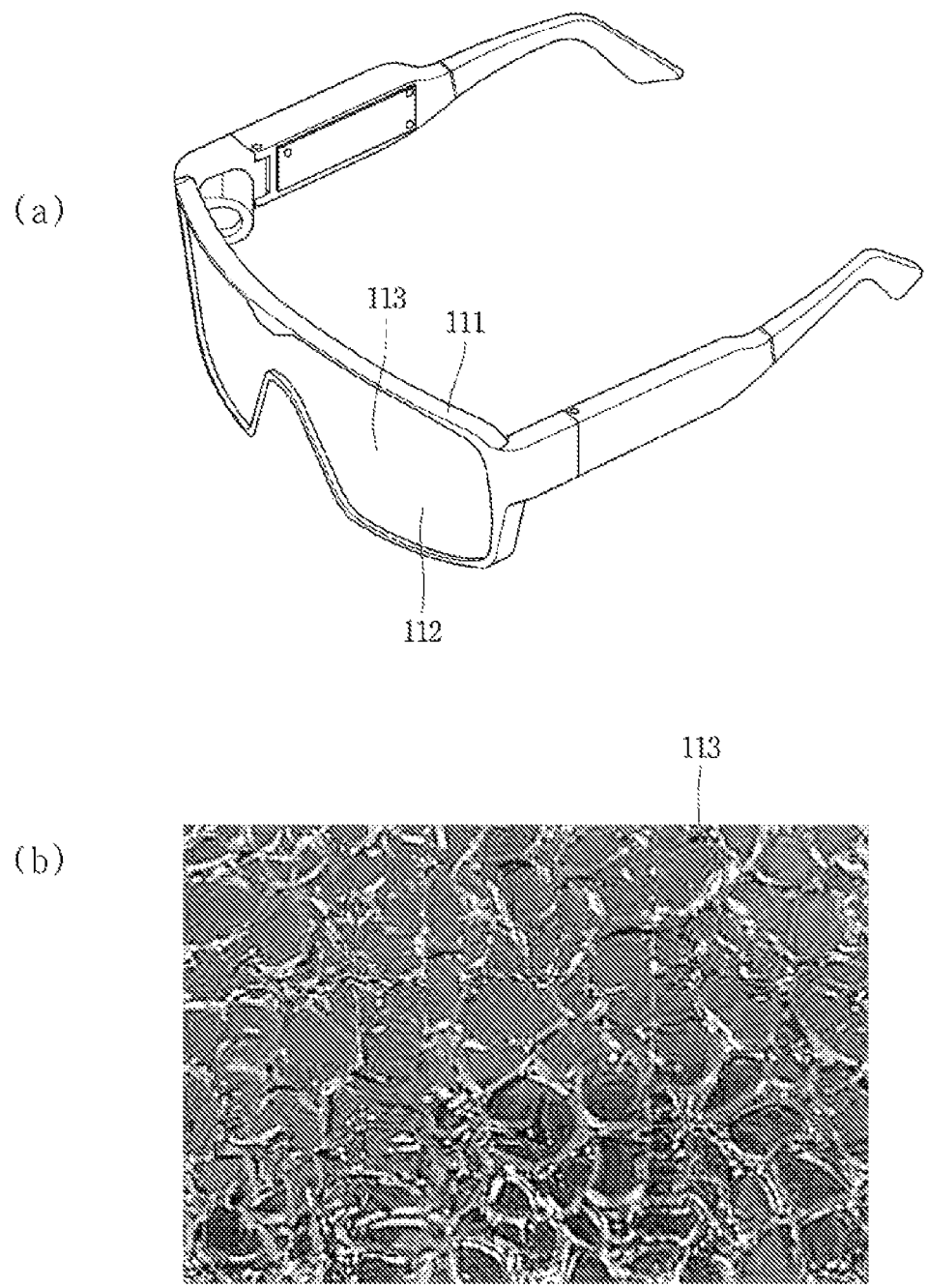
FIG. 7 is a conceptual diagram illustrating occurrence of material deterioration of photopolymers due to penetration of a liquid foreign material into the spectacle-type terminal device according to the present disclosure.
Figure 8:
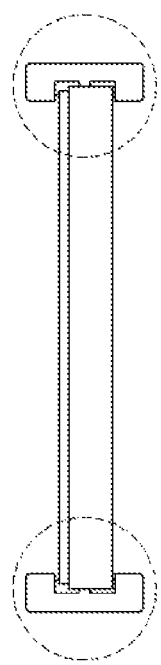
FIG. 8 illustrates a side coupling structure of the spectacle-type terminal device according to the present disclosure.
Figure 8:
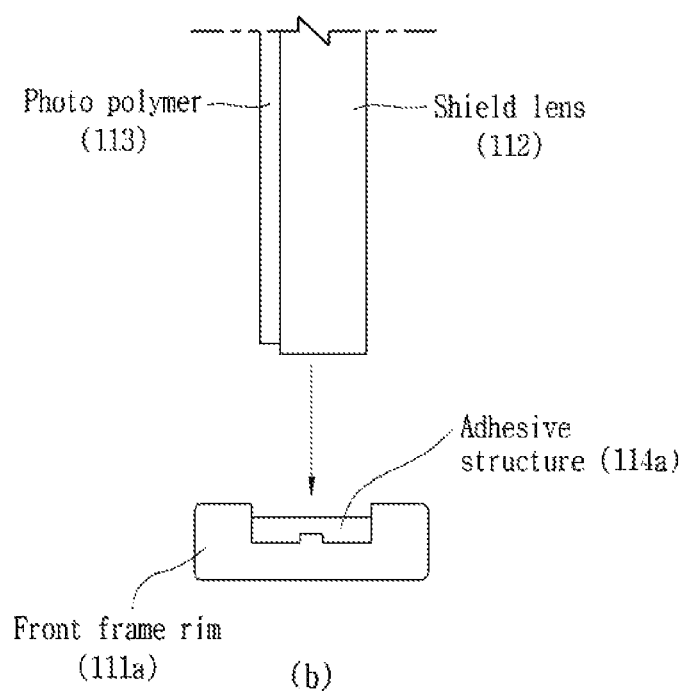
Figure 8:
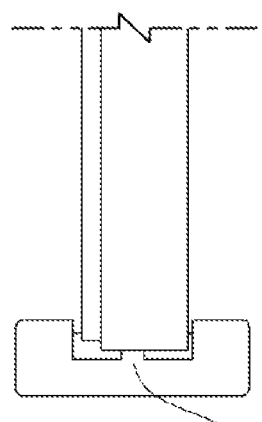

The spectacle-type terminal device 100 disclosed herein may be configured to prevent penetration of a liquid foreign material from outside. In relation to this, FIG. 7 is a conceptual diagram illustrating occurrence of deterioration of a photopolymer material due to penetration of a liquid foreign material into the spectacle-type terminal device described herein. Referring to (a) of FIG. 7, a liquid foreign material may penetrate into a boundary region between the front frame 111 and the lens 112 in which the photopolymer 113 is provided, each included in the spectacle-type terminal device. Referring to (b) of FIG. 7, when a liquid foreign material penetrates into a boundary region, deformation of a surface may occur due to material deterioration (swelling) of the photopolymer 113, Point adhesive or a resin member may be provided on a side surface to prevent penetration of a liquid foreign material such as sweat, perspiration. etc. into a boundary region in which the photopolymer 113 is laminated. In relation to this, FIG. 8 illustrates a side coupling structure of the spectacle-type terminal device according to the present disclosure. Referring to (a) of FIG. 8, the lens 112 in which the photopolymer 113 is provided may be coupled to the front frame 111 at both side regions. Referring to (b) of FIG. 8, the lens 112 in which the photopolymer 113 is provided may be coupled to the front frame 111 using an adhesive structure 114. The adhesive structure 114a may include point adhesive or a resin member. Referring to (c) of FIG. 8, an internal region of a rim 111a of the front frame 111 may have a space structure 114b. Accordingly, penetration of a liquid foreign material into a boundary region between the front frame 111 and the lens 112 in which the photopolymer 113 is provided may be prevented, and a gap between the front frame 111 and the lens 112 may be maintained.

Referring to FIGS. 5 to 8, the front frame rim 111a may be provided in the front frame 111 of the front body portion 110 to fix the lens 112 and the photopolymer 113 to the front frame 111. In relation to this, point adhesive or resin may be provided on the lens 112 and a side surface of the photopolymer 113 to prevent penetration of a liquid foreign material. In addition, point adhesive or resin in the front frame 11 may be provided inside the front frame 111 to be prevented from being inclined toward one side or overflowing. In relation to this, the spacer structure 114b may be arranged in an external body of the front frame 111, i.e., an internal space of the front frame rim 111a.

Accordingly, material deformation (swelling) due to penetration of a liquid foreign material into a side surface region of the spectacle-type terminal device may be prevented. In this case, the spacer structure 114b configured to maintain a clearance may be inserted into the rim 111a of the front frame 111 to prevent a point adhesive or a resin member from being inclined toward one side or overflowing.

Figure 9A:
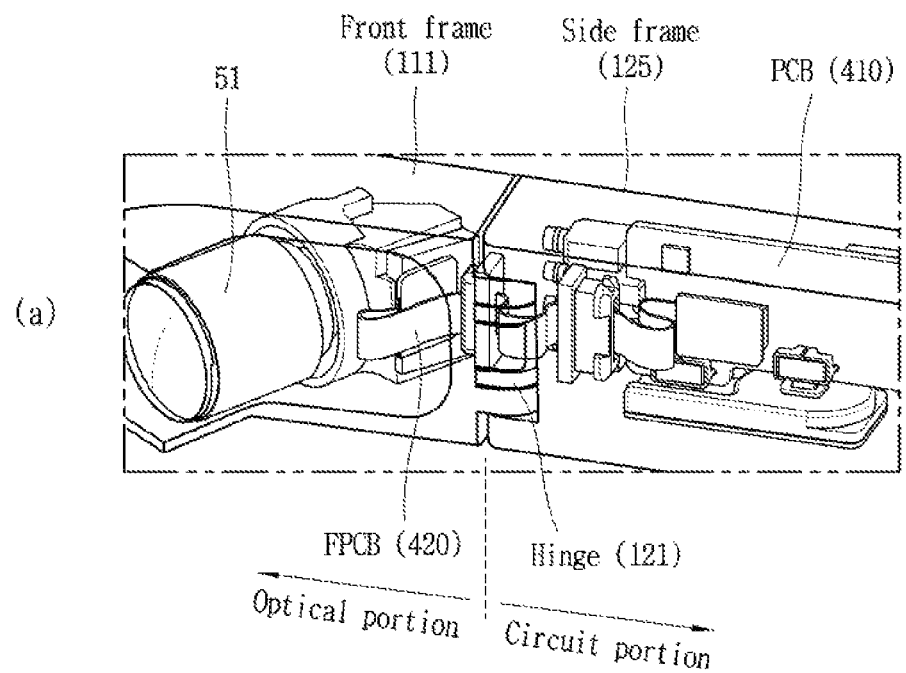
FIGS. 9A and 9B illustrate a configuration of an optical portion and a circuit portion arranged in the front body portion and the temple body portion, respectively, and a waterproof structure of a button portion in the spectacle-type terminal device according to the present disclosure.
Figure 9A:
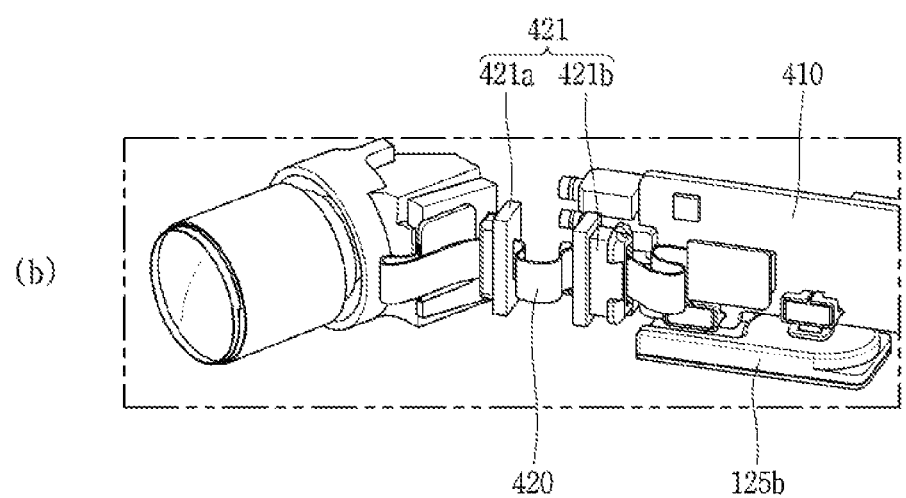

In a glass structure proposed herein, i.e., a spectacle-type terminal device, a button portion 125a may be provided in the temple body portion 125. In relation to this, as described above, an optical portion may be configured in the front body portion 110 and a circuit portion may be configured in the temple body portion 125 in the spectacle-type terminal device. FIG. 9A illustrates a configuration of an optical portion and a circuit portion arranged in a front body portion and a temple body portion of a spectacle-type terminal device described herein, respectively, and a waterproof structure of a button portion. Referring to (a) of FIG. 9A, the optical engine 51 corresponding to an optical portion may be arranged in the front body portion 110. The PCB 420 corresponding to a circuit portion may be arranged in the temple body portion 125.

As an example, the button portion 125a may be provided to be exposed in a lower region of the temple body portion 125. The button portion 125a may be configured as a power button configured to supply power and/or a control button configured to perform switching between pieces of content or change a position in which content is displayed, but is not limited thereto. A button structure 125b into which the button portion 125 is inserted may be inserted into the temple body portion 125b to be provided in the temple body portion 125b. The button structure 125b may be provided to have a waterproof member including a silicon or rubber material to prevent a liquid foreign material through a lower portion of the temple body portion 125.

Referring to (b) of FIG. 9A, a waterproof structure in a mechanical case may be configured to be coupled to the FPCB 420. In addition, FIG. 9B illustrates an internal side view in which the front frame 111 is coupled to a side frame corresponding to the temple body portion 125.

Figure 9B:
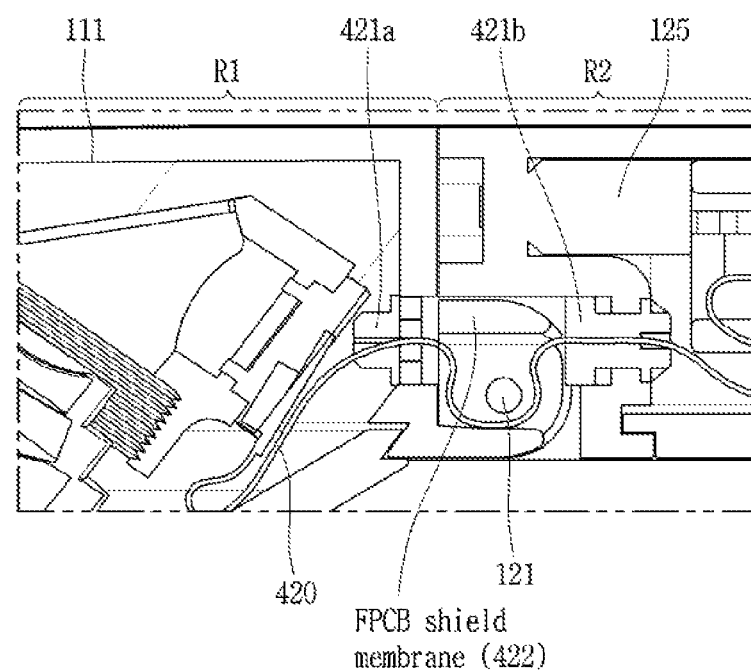

Referring to (b) of FIG. 9A and FIG. 9B, a spectacle-type terminal device may further include a waterproof structure 421 having a structure including a plurality of rims. The waterproof structure 421 may be configured to include a first rim 421a and a second rim 421b, but is not limited thereto. The waterproof structure 421 is provided to surround the FPCB 410, and include the first rim 421a having a plate shape to fix the FPCB 410 to a first region R1 of the front body portion 110. The waterproof structure 421 may further include the second rim 421b having a plate shape to be fixed to a second region R2 of the temple body portion 125. The first rim 421a may be arranged to be fixed to the first region R1 to prevent penetration of a liquid foreign material, introduced during folding, into the front frame 111. The second rim 421b may be arranged to be fixed to the second rim R2 to prevent a liquid foreign material, introduced during folding, from penetrating into the front frame 111.

Figure 10:
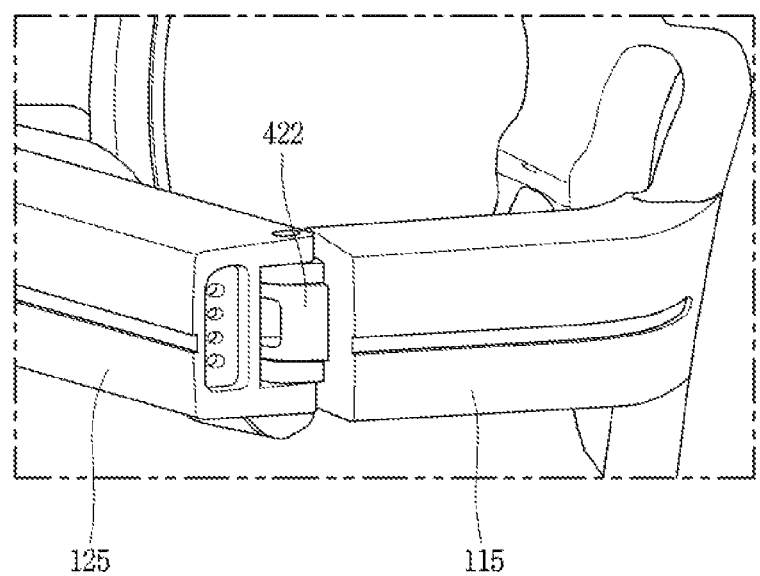
FIG. 10 illustrates a flexible printed circuit board (FPCB) shield membrane structure provided on an outer side surface of the FPCB not to expose some internal parts to outside during folding of the spectacle-type terminal device according to the present disclosure is folded.

When the glass structure proposed herein, i.e., the spectacle-type terminal device is folded, some internal parts may be exposed to outside. In relation to this, FIG. 10 illustrates an FPCB shield membrane structure provided on an outer side surface of an FPCB not to expose some internal parts to outside when the spectacle-type terminal device described herein is folded. Referring to FIG. 10, the spectacle-type terminal device may further include an FPCB shield membrane 422.

Referring to FIGS. 9B and 10, the FPCB shield membrane 422 may be implemented using a substrate or a film having flexibility, e.g., the FPCB 420. The FPCB shield membrane 422 may be arranged outside the hinge portion 121 not to expose the FPCB 420, arranged to surround the hinge portion 121, to outside even when the spectacle-type terminal device is folded.

Figure 11:
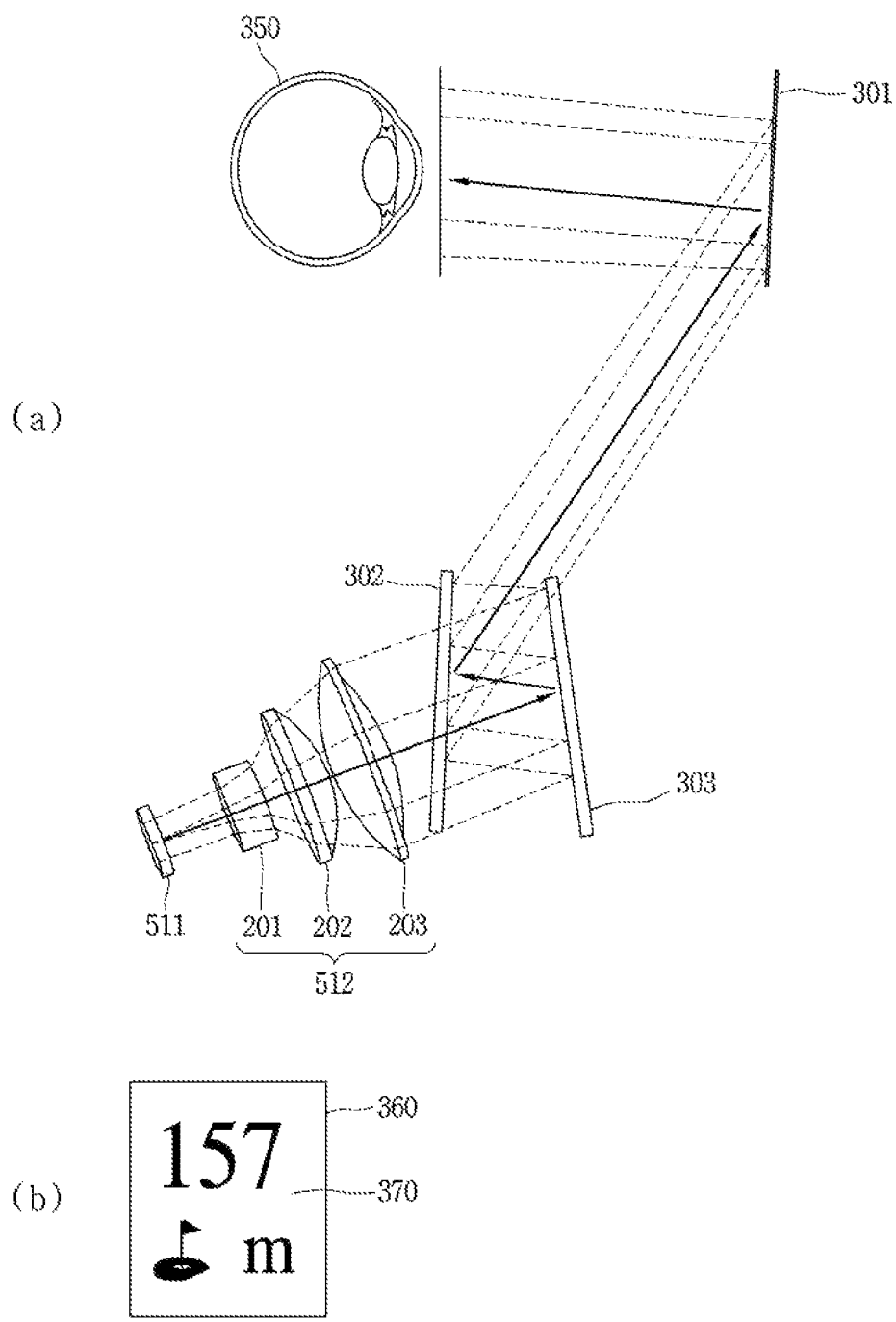
FIG. 11 is a conceptual diagram illustrating an optical system in which a virtual image is displayed from light of an image source in the spectacle-type terminal device according to the present disclosure.

FIG. 11 is a conceptual diagram illustrating an optical system in which a virtual image is displayed from light of an image source in the spectacle-type terminal device 100 described herein.

Referring to (a) of FIG. 11, the optical engine in the spectacle-type terminal device 100 according to an embodiment of the present disclosure may include the optical module 511 and the lens unit 512 including a plurality of lenses. Here, the optical module 511 may include, as an image source, a light source using a self-emission method or an illumination light method to have a greater wavelength that that of laser light, e.g., an OLED or an LED, the micro display 511 is arranged in a lower portion of the optical engine 51 that may have a cylindrical structure to output image light having a certain wavelength band.

The lens unit 512 may be configured to include at least one concave lens 201, a convex lens 202, and a collimating lens 203. Here, the convex lens 202 may be a plane convex lens having one flat surface. The concave lens 201, the convex lens 202, and the collimating lens 203 may be sequentially arranged along an optical axis of light emitted by the optical module 511, as illustrated in (a) of FIG. 3.

In addition, as illustrated in (a) of FIG. 11, the first reflection element 303 and the second hologram optical element 302 may be arranged to face each other. In this case, a surface of the second hologram optical element 302 in a direction in which the lens 512 is arranged is referred to as a first surface, and a surface of the second hologram optical element 302 facing a reflection surface of the first reflection element 303 is referred to as a second surface.

Referring to FIGS. 5A, 5B, and 11, the optical engine 51 may be configured to include the display 511 and the plurality of lenses 512 therein. In addition, the optical engine 51 may further include the second HOE 302 and the reflection element 303 therein. The second HOE 302 and the reflection element 303 may be arranged in the optical engine 51 at different angles as illustrated in FIG. 11.

At least a part of the second HOE 302 and the reflection element 303 may be arranged on one side surface of the support member 51b. In relation to this, an angle at which an upper region of the optical engine 51 is provided may be different from an angle at which an upper region of the support member 51b supporting the optical engine 51 is provided. Accordingly, the second HOE 302 and the reflection element 303 may be arranged inside and outside the optical engine 51, respectively, to have different angles as illustrated in FIG. 11.

In relation to this, the optical engine 51 may include the diffraction element 310 configured to reflect or diffract image light at a preset angle. The HOE 301 may be configured to offset dispersion of image light reflected, diffracted, and thus, dispersed at the diffraction element 310, and reflect the image light of which dispersion is offset. Accordingly, the HOE 301 may be configured to display a virtual image corresponding to the image light by reflecting the image light of which dispersion is offset.

The diffraction element 310 may include a plurality of HOEs, or an HOE and a reflection element, or a plurality of reflection elements. As an example, the diffraction element 310 may be configured to include the second HOE 302 having particular ranges of incident angles and reflection angles, and the reflection element 303. The second HOE 302 may be configured to transmit light when the light is incident at an angle within a preset range of incident angles, and reflect light when the light is incident at an angle within a preset range of reflection angles. The first reflection element 303 may be arranged such that a reflection surface thereof is directed toward the second HOE 302 at a preset angle. In relation to this, the second HOE 302 may be referred to as a second reflection element 302.

As another example, the diffraction element 310 may be configured to include the second HOE 302 and a third HOE 303. As a reflection element is substituted by the third HOE 303, sharpness deterioration due to diffused reflection components other than a corresponding light source may be prevented according to angle selectivity and wavelength selectivity. As another example, the diffraction element 310 may be configured to include the first reflection element 303 and the second reflection element 302. Accordingly, reflection performance deterioration due to a change in an incident angle of a light source according to a relative position change of a part in the optical engine 51 may be prevented.

The optical engine 51 may be provided in a cylindrical structure, and the first reflection element 303 and a second reflection element provided as the second HOE 302 may be arranged in an upper region of the cylindrical structure at different angles. In this case, due to the first reflection element 303 and the second reflection element 302 provided at different angles, image light may be reflected onto the second reflection element 302, the first reflection element 303, and then, the second reflection element 302. Accordingly, the image light having been reflected onto the second reflection element 302, the first reflection element 303, and then, the second reflection element 302 may be directed toward the HOE 301 provided in the photopolymer 103.

The micro display 511 may be arranged in a lower portion of the optical engine 51 having a cylindrical structure to output image light having a certain wavelength band. The micro display 511 may be arranged to be directed toward the second HOE 302 at an angle within a range of incident angles to be configured such that image light having been incident on the second HOE 302 penetrates through the second HOE 302.

The first reflection unit 303 and the second reflection unit 302 may be arranged at different angles. The first reflection element 303 may be arranged to be inclined further toward one axial direction compared to the second HOE 302. Light penetrating through the first surface of the second HOE 302 may be reflected on the second surface of the second HOE 302 by the first reflection element 303 arranged to be inclined further toward the one axial direction.

The second HOE 302 and the first reflection element 303 may be arranged to face each other to overlap optical paths with each other. Configuration may be such that a first path in which light penetrates through the second HOE 302 and proceeds toward a reflection surface of the first reflection element 303 overlaps a path of light reflected onto the reflection surface of the first reflection element 303 and proceeding toward the second surface of the second HOE 302. To do so, the reflection surface of the first reflection element 303 may be arranged to face the second surface of the second HOE 302.

Light output from the optical module 511 may be emitted through the concave lens 201, and the light emitted through the concave lens 201 may be expanded by the convex lens 202. Then, the light expanded by the convex lens 202 may be converted into parallel light through the collimating lens 203 and incident on the first surface of the second hologram optical element 302.

Here, the parallel light, i.e., a result of the converting through the collimating lens 203 may be incident on the first surface of the second hologram optical element 302 at an angle within a preset range of incident angles. Accordingly, as illustrated in (a) of FIG. 11, the parallel light may be transmitted by the second hologram optical element 302, and the transmitted parallel light, i.e., transmitted light may be incident on the first reflection element 303.

The first reflection element 303 may reflect the transmitted light along a reflection angle corresponding to an angle (an incident angle) at which the transmitted light is incident. In this case, as illustrated in (a) of FIG. 3, a reflection surface of the first reflection element 303 is arranged to face the second face of the second hologram optical element 302. Accordingly, reflected light reflected onto the first reflection element 303 may be incident on the second surface of the second hologram optical element 302. In this case, since the reflected light is incident at an angle outside a preset range of incident angles, the reflected light may not be transmitted, but reflected onto the second surface of the second hologram optical element 302, The second hologram optical element 302 may be a hologram optical element configured to reflectively diffract pre-designed incident light at a particular angle. Accordingly, the reflected light reflected onto the first reflection element 303 may be diffracted on the second surface of the second hologram optical element 302, and light dispersed according to the diffraction may be reflected at a preset angle. In this case, the light dispersed according to the diffraction may be positively dispersed light. Here, "reflective diffraction of incident light at a particular angle" means that incident light is reflected and diffracted at a particular angle. As an example, this means a configuration such that "incident light is reflected on a first plane at a first angle, and then, the reflected incident light is diffracted on a second plane at a second angle."

The light diffracted and reflected on the second surface of the second hologram optical element 302 may proceed toward the first hologram optical element 301. Here, the first hologram optical element 301 may be a hologram optical element configured to reflectively diffract pre-designed incident light at a particular angle, like the second hologram optical element 302. Accordingly, when reflected light having reached the first hologram optical element 301 is incident at an angle outside a preset range of incident angles, i.e., a range of incident angles at which light is transmitted, the reflected light may be reflected and diffracted by the first hologram optical element 301.

When light is diffracted by the second hologram optical element 302, positive dispersion is generated. Accordingly, the light having been reflected by the second hologram optical element 302 may proceed toward the first hologram optical element 301 in a state when the positive dispersion is generated. Accordingly, the first hologram optical element 301 may be an optical element configured to negatively disperse incident light to offset dispersion (positive dispersion) of the incident light. That is, the first hologram optical element 301 may be an optical element configured to negatively disperse incident light through diffraction, and reflect the negatively dispersed incident light.

The "positive dispersion" means a phenomenon in which, among light incident on an HOE from a display (or a light source) having a large wavelength width, long-wavelength light is bent less and short-wavelength light is bent more. On the other hand, the "negative dispersion" means a phenomenon in which, among light incident on an HOE from a display (or a light source) having a large wavelength width, long-wavelength light is bent more and short-wavelength light is bent less. Due to such negative dispersion, deterioration of resolution power may occur.

Light diffracted (negatively dispersed) and reflected through the first hologram optical element 301 may be incident on a pupil of a user. Accordingly, a virtual image 370 corresponding to reflected light having reached the first hologram optical element 301 may be provided on one region (an EMB) 360 on the glass 112 in a form as illustrated in (b) of FIG. 11.

Figure 12:
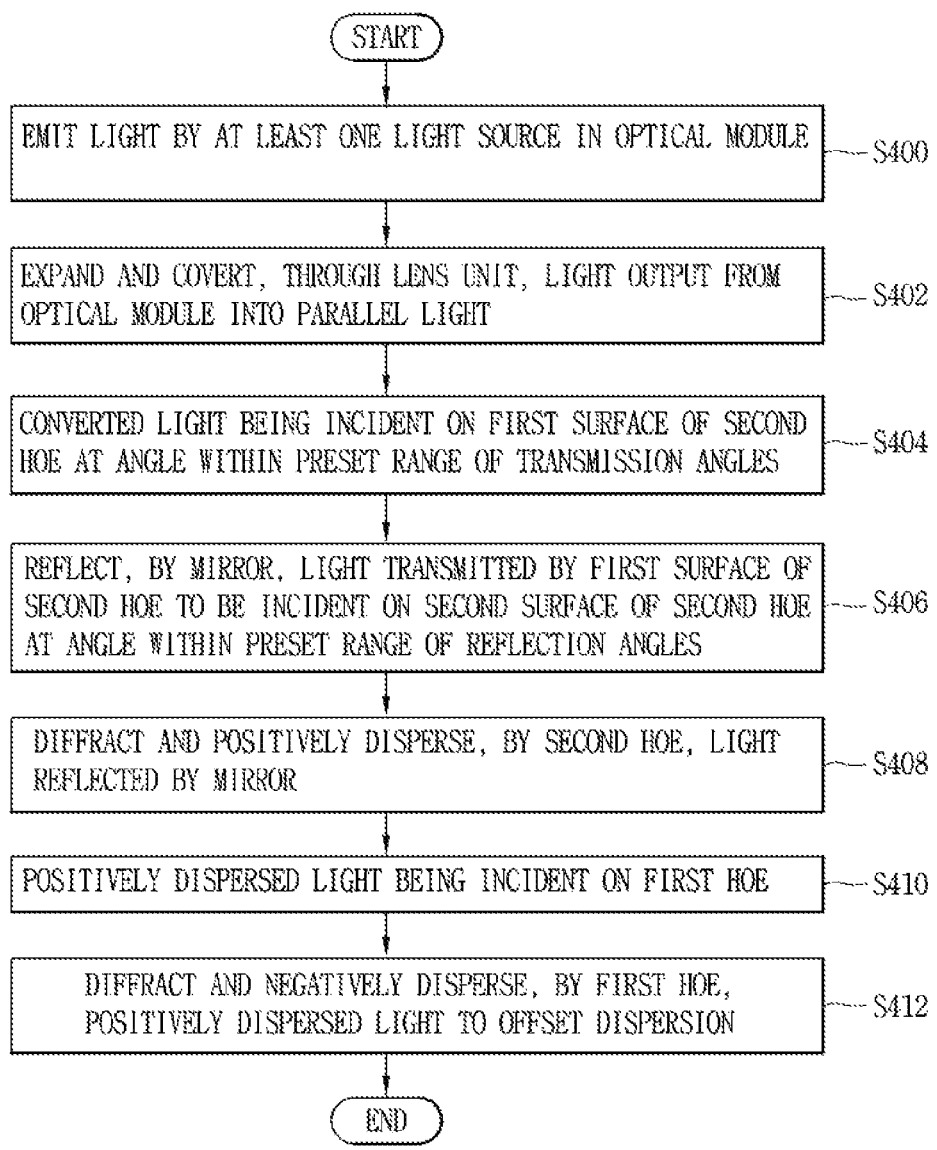
FIG. 12 is a flowchart illustrating a process of, by the spectacle-type terminal device described herein, providing a virtual image.

FIG. 12 is a flowchart illustrating a process of, by the spectacle-type terminal device described herein, providing a virtual image. In addition, FIGS. 13A and 13B are graphs illustrating transmission and reflection characteristics of a hologram optical element used in the spectacle-type terminal device according to the present disclosure.

Referring to FIG. 12, the optical module 511 in the spectacle-type terminal device 1 according to an embodiment of the present disclosure may output light for generating a virtual image. To do so, at least one light source included in the optical module 511, i.e., an image source may emit light (S400).

The lens unit 512 may emit and expand light output from the optical module 511. Then, the expanded light may be converted into parallel light (S402). Then, the parallel light, i.e., a result of the conversion by the lens unit 512 may be incident on a first surface of the second hologram optical element 302 at an angle within a preset range of incident angles of light transmission, i.e., a range of transmission angles (S404).

Figure 13A:
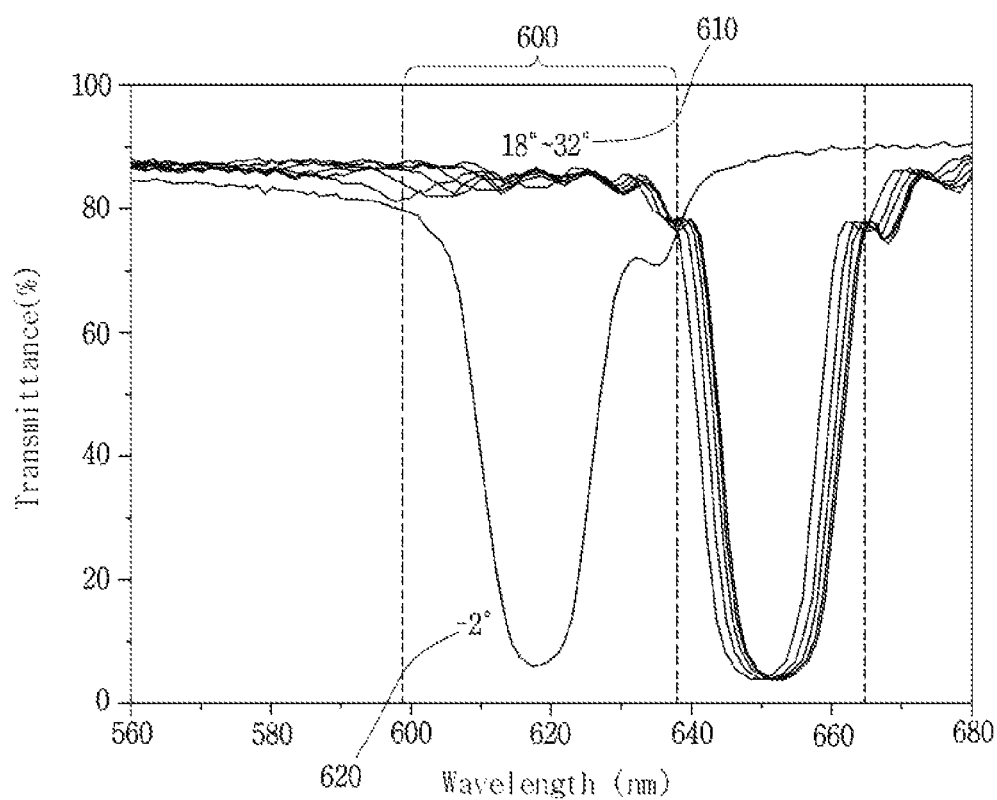
FIGS. 13A and 13B are graphs illustrating transmission and reflection characteristics of a hologram optical element used in the spectacle-type terminal device according to the present disclosure.
Figure 13B:
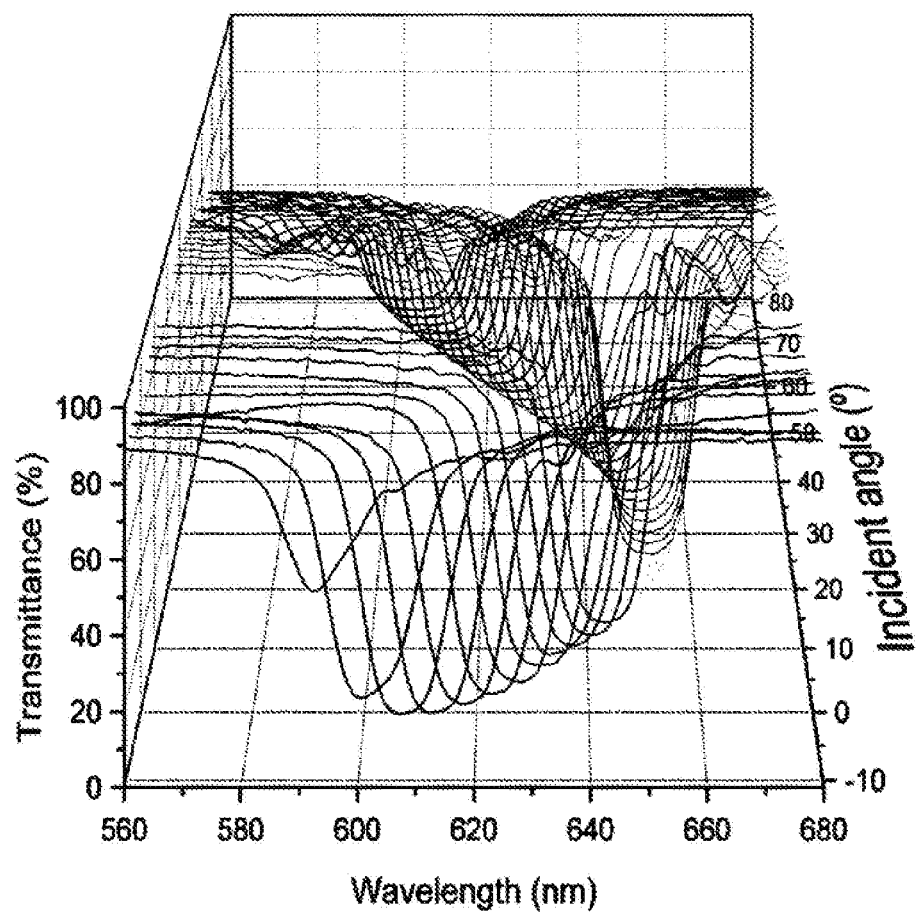

As an example, light transmission and reflection characteristics of the second hologram optical element 302 according an incident angle of light are illustrated in FIGS. 13A and 13B. FIGS. 13A and 13B are diagrams illustrating transmittance according to wavelengths within a range of incident angles from −10 degrees (350 degrees) to 80 degrees. FIG.

13A is a diagram illustrating a two-dimensional (2D) graph of transmittance according to wavelengths corresponding to each incident angle. FIG. 13B is a diagram illustrating a 3D graph of transmittance according to wavelengths of each light corresponding to a range of respective incident angles.

Referring to FIG. 13A, respective graphs of FIG. 13A correspond to different incident angles, and a horizontal axis indicates a wavelength (nm) and a vertical axis indicates transmittance. Accordingly, as described above, in the present disclosure in which a digital micro-mirror device (DMD) employing a micro LED, a micro OLED, an LCoS, an LED, or an SLD each having a great wavelength than that of laser light is used as an image source, it may be understood that in a wavelength band of light used as an image source, i.e., in a display wavelength band 600, a hologram optical element has lowest transmittance with respect to light having an incident angle of −2 degrees (358 degrees) and high transmittance with respect to light having an incident angle of 18 degrees to 32 degrees.

Accordingly, with respect to hologram optical elements used in the spectacle-type terminal device 1 according to an embodiment of the present disclosure, a preset light incident angle at which light transmission occurs (an incident angle of transmitted light) may be in a range from 18 degrees to 32 degrees. It may be understood that when an incident angle is outside this range, the hologram optical elements reflect light.

Therefore, the lens unit 512 may be arranged to be directed toward a first surface of the second hologram optical element 302 at an angle within a range of incident angles (from 18 degrees to 32 degrees) at which light transmission occurs, so that light penetrates through the second hologram optical element 302 to proceed toward the first reflection element 303.

Accordingly, parallel light of the lens unit 514 incident upon the second hologram optical element 302 may penetrate through the second hologram optical element 302. In addition, light transmitted by the second hologram optical element 302, i.e., the transmitted light may be incident on the first reflection element 303 arranged to face the second surface of the second hologram optical element 302, and the first reflection element 303 may reflect the incident transmitted light on the second surface of the second hologram optical element 302 (S406).

In this case, an optical path (a first path) of light penetrating through the first surface of the second hologram optical element 302 may overlap an optical path (a second path) of light reflected on the first reflection element 303 to be incident on the second surface of the hologram optical element 302. Accordingly, since the first path and the second path may be compressed into one path, a space required for the diffraction unit 52 to ensure an optical path may be saved.

As illustrated in FIG. 13A, with respect to the hologram optical elements used in the spectacle-type terminal device 1 according to an embodiment of the present disclosure, it may be understood that transmittance decreases when light is incident at −2 degree (358 degrees), i.e., in a direction near a horizon, and thus, transmittance increases accordingly. Accordingly, when light having reflected from the first reflection element 303 is incident at an angle outside a preset range of incident angles (18 degrees to 32 degrees), the incident light may be reflected.

In this case, to increase transmittance of the second hologram optical element 302, the first reflection element 301, i.e., a mirror may be arranged to form an angle of −2 degrees between a direction toward which a reflection surface of the first reflection element 303 is directed and a direction toward which a second surface of the second hologram optical element 302 is directed, so that reflected light is incident on the second surface of the second hologram optical element 302 according to a reflection angle within a preset range (e.g.: −2 degrees). Accordingly, light having been reflected onto the first reflection element 303 may be incident on a second surface of the second hologram optical element 302 at an angle corresponding to a preset reflection angle.

The light incident on the second surface of the second hologram optical element 302 may be diffracted and positively dispersed. In addition, the reflected light having been positively dispersed may be reflected through the second surface of the second hologram optical element 302 (S408).

Accordingly, the positively dispersed light having reflected on the second surface of the second hologram optical element 302 may be incident on the first hologram optical element 301 (S410). Here, the first hologram optical element 301 may be an optical element configured to negatively disperse the incident light. Therefore, the light having been incident on the first hologram optical element 301 may be negatively dispersed by the first hologram optical element 301, and the negatively dispersed light may be reflected on the first hologram optical element 301 to be incident on a pupil of a user (S412). Accordingly, light dispersion that has occurred in the second hologram optical element 302 may be offset by the first hologram optical element 301.

As such, the spectacle-type terminal device according to an embodiment of the present disclosure provides an optical path including the first hologram optical element 301 configured to offset dispersion of light that has occurred through the second hologram optical element 302, the first reflection element 303, and then, the second hologram optical element 302. Thus, a sharp virtual image may be provided on the glass 112 without having to use light having an extremely short wavelength such as laser light.

According the description above, a horizontal distance (IPD) between points of both-side pupils among people greatly vary depending on people, races, genders, or ages.

Figure 14A:
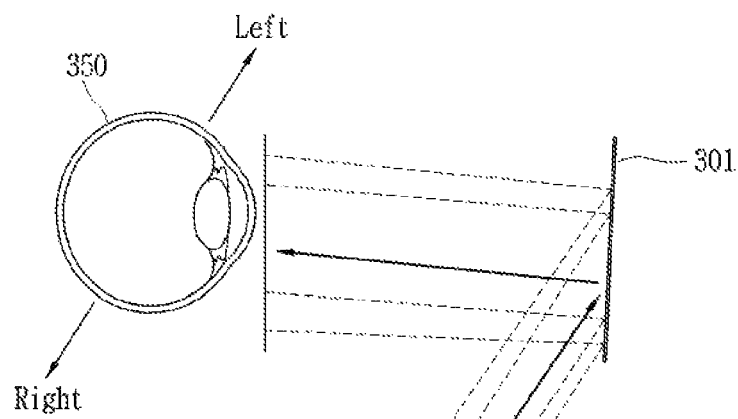
FIGS. 14A and 14B illustrate examples of a virtual image provided in different positions according to an inter pupil distance (IPD) difference.
Figure 14A:
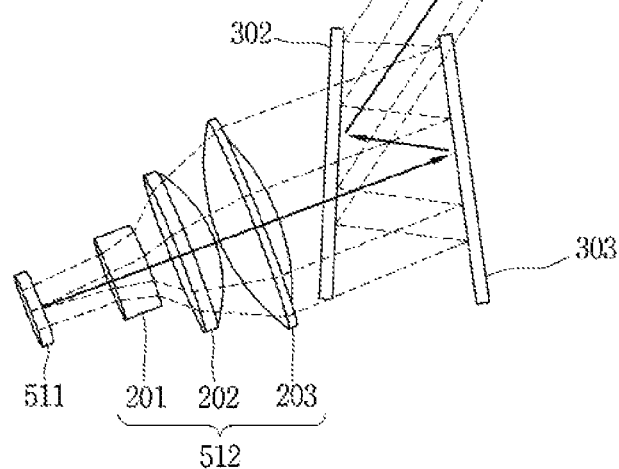
Figure 14A:
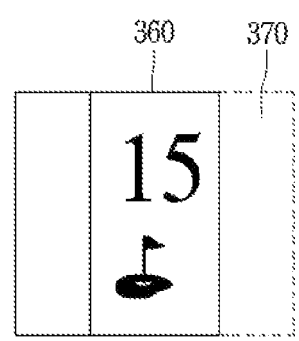
Figure 14B:
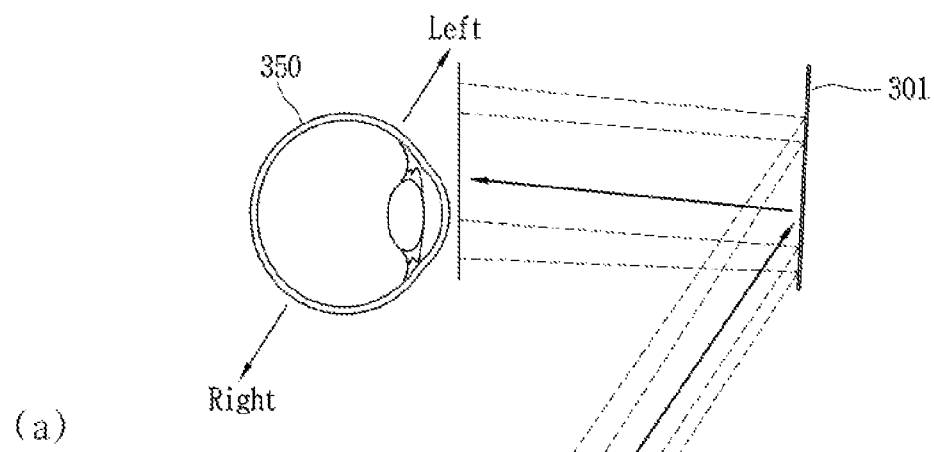
Figure 14B:
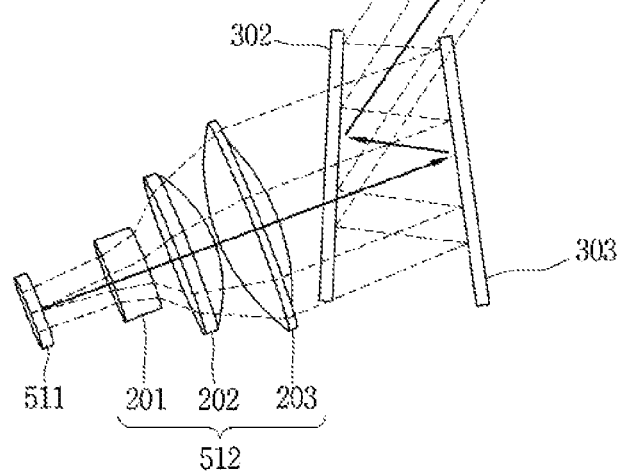
Figure 14B:
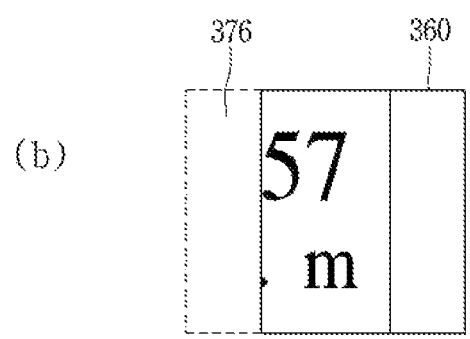

FIGS. 14A and 14B illustrate examples of a virtual image provided in different positions according to an inter pupil distance (IPD) difference.

Hereinafter, a description will be provided on an assumption that a virtual image is generated on glass corresponding to a right eye of a user. However, the present disclosure is not limited thereto. That is, when a virtual image is generated on glass corresponding to a left eye of a user, the virtual image may be also generated on one region of the glass corresponding to a left eye in a similar method to be described below.

Referring to FIG. 14A, when an IPD of a user is outside a preset range due to a head size or a physical characteristic of a user, i.e., when the IPD is less than a minimum value in the preset IPD range, one region on the glass 112 corresponding to a pupil of the user may be changed. In this case, as illustrated in (a) of FIG. 14A, a virtual image may be provided in one region on the glass 112 corresponding to a right side of the pupil of the user.

In addition, as such, when a virtual image is provided in one region on the glass 112 corresponding to the right side of the pupil of the user, a virtual image may be displayed in a position inclined toward a right side from a center of the EMB 360 as illustrated in (b) of FIG. 14A.

In this case, a region in which a virtual image 370 is displayed may be different from a region of the EMB 360 provided by the first hologram optical element 301. That is, as the virtual image 370 is displayed on a right side of the EMB 360, a part of the virtual image 370 may be displayed outside the EMB 360. Accordingly, as illustrated in (b) of FIG. 14A, a part of the virtual image 370 may be displayed in a region that cannot be viewed by a user. Thus, such a problem that the user may not view a part of the virtual image 370 may occur.

On the other hand, when an IPD of the user is outside a preset range due to a head size or a physical characteristic of the user, i.e., when the IPD is greater than a maximum value in the preset IPD range, one region on the glass 112 corresponding to a pupil of the user may be changed. In this case, as illustrated in (a) of FIG. 14B, a virtual image may be provided in one region on the glass 112 corresponding to a left side of the pupil of the user.

In addition, as such, when a virtual image is provided in one region on the glass 112 corresponding to the left side of the pupil of the user, a virtual image may be displayed in a position inclined toward a left side from a center of the EMB 370 as illustrated in (b) of FIG. 14B.

In this case, a region in which a virtual image 370 is displayed may be different from a region of the EMB 360 provided by the first hologram optical element 301. That is, as the virtual image 370 is displayed on a left side of the EMB 360, a part of the virtual image 370 may be displayed outside the EMB 360. Accordingly, as illustrated in (b) of FIG. 14B, such a problem that the user may not view a part of the virtual image 370 may occur.

To solve this problem, a proceeding angle of light incident on the first hologram optical element 301 may be changed in the present disclosure. To do so, in the present disclosure, an angle at which the first reflection element 303 is directed toward the second surface of the second hologram optical element 302 may be changed to thereby change a reflection angle of light incident on the first hologram optical element 301, i.e., light reflected on a second surface of the second hologram optical element 302. That is, in the present disclosure, by tilting the first reflection element 303 to rotate at a certain angle, an incident angle of light incident on the second surface of the second hologram optical element 302 may be changed, and thus, a reflection angle of light reflected on the second surface of the second hologram optical element 302 may be changed.

Figure 15:
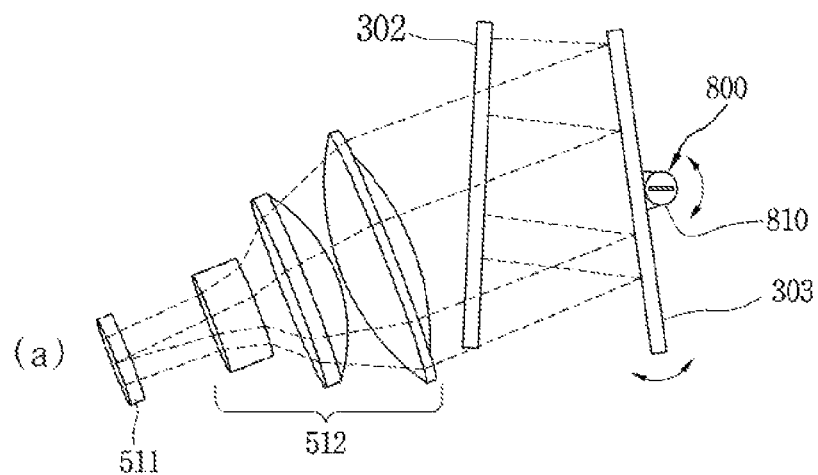
FIG. 15 illustrates examples of a first reflection element 303 provided to be tiltable in the spectacle-type terminal device according to the present disclosure.
Figure 15:
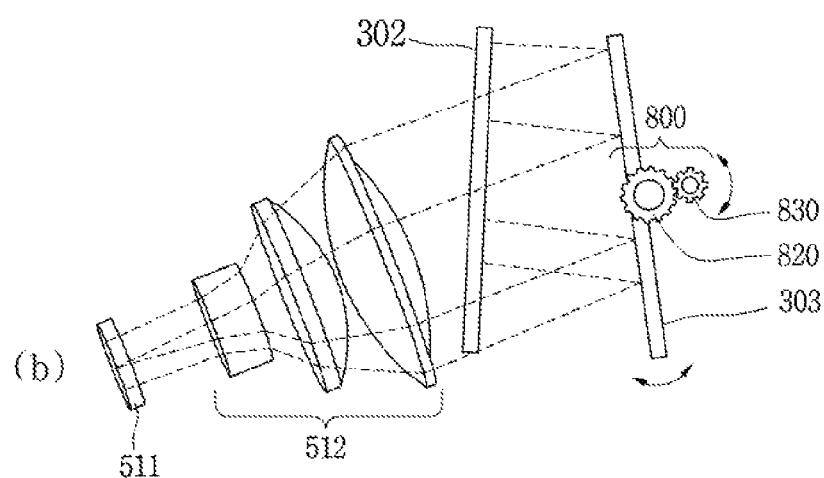
Figure 16A:
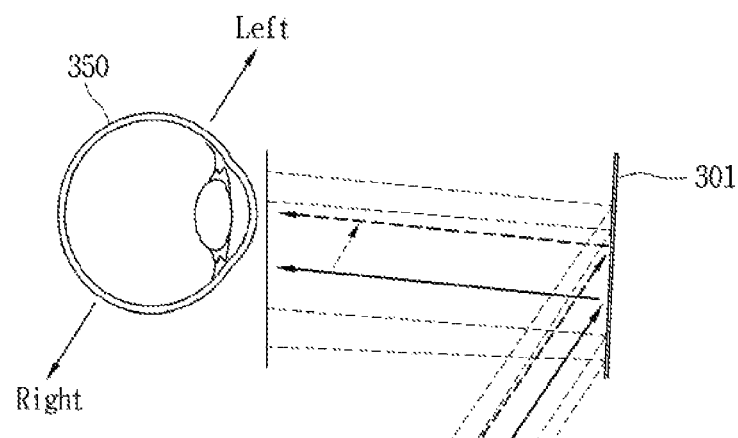
FIGS. 16A and 16B illustrate examples of, by the first reflection element 303 that is tilted, compensating for a generation location of a virtual image according to an IPD difference in the spectacle-type terminal device 1 related to the present disclosure.
Figure 16A:
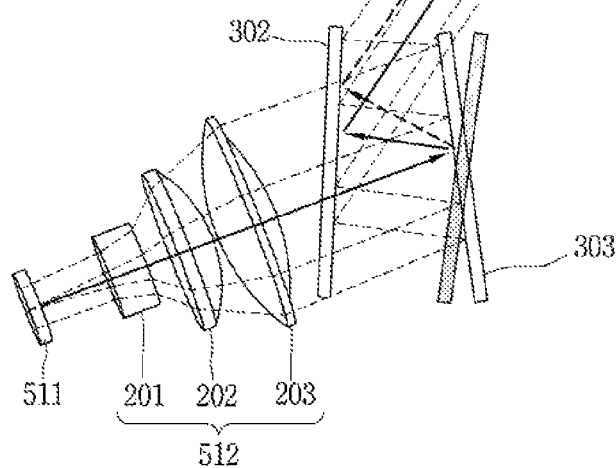
Figure 16A:
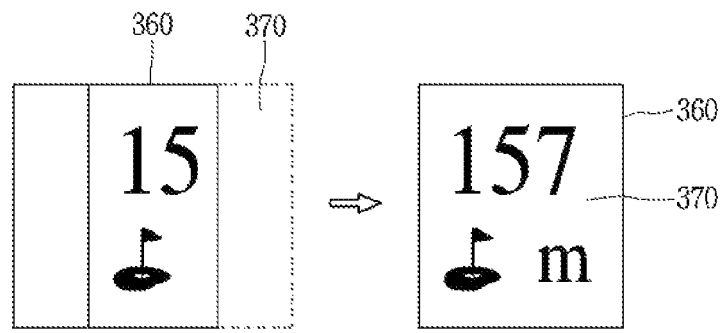
Figure 16B:
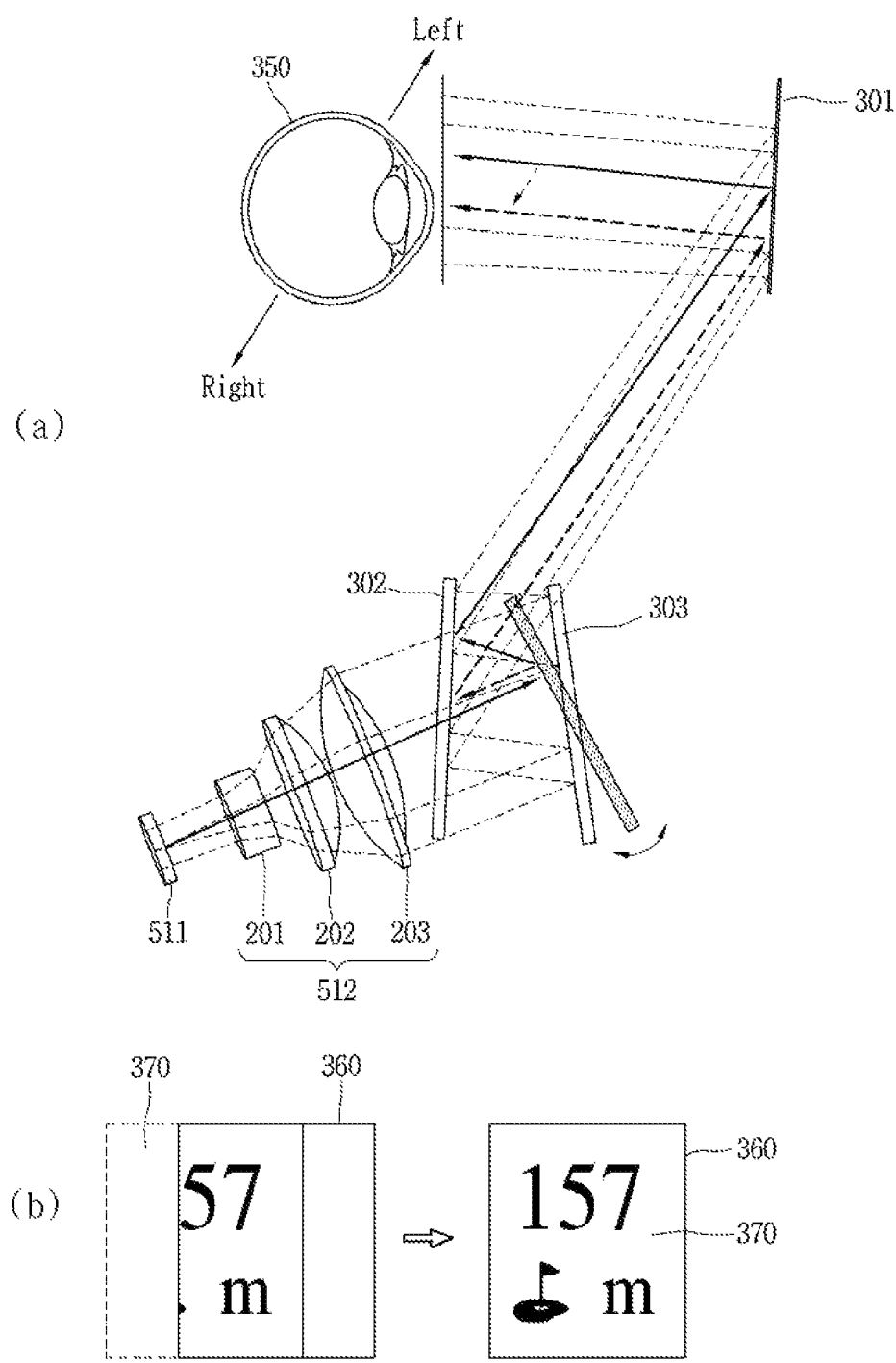

FIG. 15 illustrates examples of the first reflection element 303 provided to be tiltable in the spectacle-type terminal device 1 related to the present disclosure. In addition, FIGS. 16A and 16B illustrate examples of, by the first reflection element 303 that is tilted, compensating for a generation location of a virtual image according to an IPD difference in the spectacle-type terminal device related to the present disclosure.

Referring to (a) and (b) of FIG. 15, the diffraction unit 52 according to an embodiment of the present disclosure may further include a tilting portion 800 configured to tilt the first reflection element 303. To do so, the first reflection element 303 may include a rotating shaft 820 in a vertical direction traversing a center of the first reflection element 303 on a rear surface, and the tilting portion 800 may include at least one component configured to rotate the rotating shaft 800 in a clockwise direction or a counter-clockwise direction.

The spectacle-type terminal device 1 may further include the tilting portion 800 configured to change an angle at which a reflection surface is directed toward the second HOE 303 by rotating the first reflection element 303 by a certain angle. In relation to this, a field of view (FOV) may be adjusted in a horizontal direction through the tilting portion 800. As another example, a field of view (FOV) may be also adjusted in a vertical direction through the tilting portion 800.

As an example, the rotating shaft 820 may include a plurality of protrusions having a saw-toothed shape and provided at same intervals along the rotating shaft 820. In addition, the tilting portion 800 may include a gear 830 including protrusions arranged in a saw-toothed direction to be engaged with the plurality of protrusions on the rotating shaft 820, and a dial gage 810 including the gear 830 or connected to the gear 830.

The dial gage 810 may be provided to be rotatable as illustrated in (a) and (b) of FIG. 16A. In addition, rotational movement of the dial gage 810 may be transmitted to the rotating shaft 820 of the first reflection element 303 through the gear 830 connected to the dial gage 810 or provided integrally with the dial gage 810. Accordingly, as the dial gage 810 rotates, the first reflection element 303 may rotate at a certain angle, and as the first reflection element 303 rotates, an angle at which a front surface of the first reflection element 303 is directed may be changed.

In this case, when the angle at which the front surface of the first reflection element 303 is directed is changed, an incident angle at which light having been reflected by the first reflection element 303 is incident on a second surface of the second hologram optical element 302 may be changed. Then, a reflection angle of the light reflected on the second surface of the second hologram optical element 302 may be also changed. Accordingly, a position of an incident point of light incident on the first hologram optical element 301 may be changed.

As an example, as illustrated in (a) of FIG. 16A, when the first reflection element 303 rotates in a direction of increasing an incident angle of light incident on the second hologram optical element 302, a reflection angle of light reflected on the second surface of the second hologram optical element 302 may be also increased.

Accordingly, as illustrated in (a) of FIG. 16A, an incident angle at which light having been reflected on the second hologram optical element 302 is incident on the first hologram optical element 301 may be increased. Accordingly, in the first hologram optical element 301, when a reflection position of light having been incident from the second hologram optical element 302 is moved to a left side, a generation location of a virtual image viewed by an eye of a user may be moved to a left side, i.e., in a direction toward a middle portion between eyebrows of the user (an outer direction from both eyes).

Accordingly, as the first reflection element 303 is tilted in a horizontal and/or vertical direction, a generation location of the virtual image may be changed. When the first reflection element 303 rotates to increase an incident angle of light incident on the second surface of the second HOE 302, a display position on a lens may be moved in a direction toward a middle portion between eyebrows of the user. In addition, when the first reflection element 303 rotates to decrease an incident angle of light incident upon the second surface of the second HOE 302, a display position on a lens may be moved in a direction toward a temple of the user.

Therefore, as an IPD of the user is less than a preset level, since a display region of the virtual image 370 is outside the EMB 360 and thus a right part of the virtual image 370 is shown as being cut out as illustrated in a first drawing (a left drawing) of (b) of FIG. 16A, a location in which the virtual image 370 is provided may be moved to a left side. Accordingly, as illustrated in a second drawing (a right drawing) of (b) of FIG. 16A, a virtual image may be changed to a state in which a whole of the virtual image is displayed in the EMB 360, and accordingly, the user may view the whole virtual image with naked eyes.

On the other hand, as illustrated in (a) of FIG. 16B, when the first reflection element 303 rotates in a direction of decreasing an incident angle of light incident on the second surface of the second hologram optical element 302, a reflection angle of light reflected on the second surface of the second hologram optical element 302 may be also decreased.

Accordingly, as illustrated in (a) of FIG. 16B, an incident angle at which light having been reflected on the second hologram optical element 302 is incident on the first hologram optical element 301 may be also decreased. Accordingly, in the first hologram optical element 301, since a reflection location of light incident from the second hologram optical element 302 is moved to a right side, a generation location of a virtual image viewed by an eye of a user may be moved to a right side, i.e., in a direction toward a temple of a user (an inner direction from both eyes).

Therefore, as an IPD of the user is greater than a preset level, when a display region of the virtual image 370 is outside the EMB 360 and thus a left part of the virtual image 370 is shown as being cut out as illustrated in a first drawing (a left drawing) of (b) of FIG. 16A, a location in which the virtual image 370 is provided may be moved to a right side. Accordingly, as illustrated in a second drawing (a right drawing) of (b) of FIG. 16B, a virtual image may be changed to a state in which a whole of the virtual image is displayed in the EMB 360, and accordingly, the user may view the whole virtual image with naked eyes.

Figure 17A:
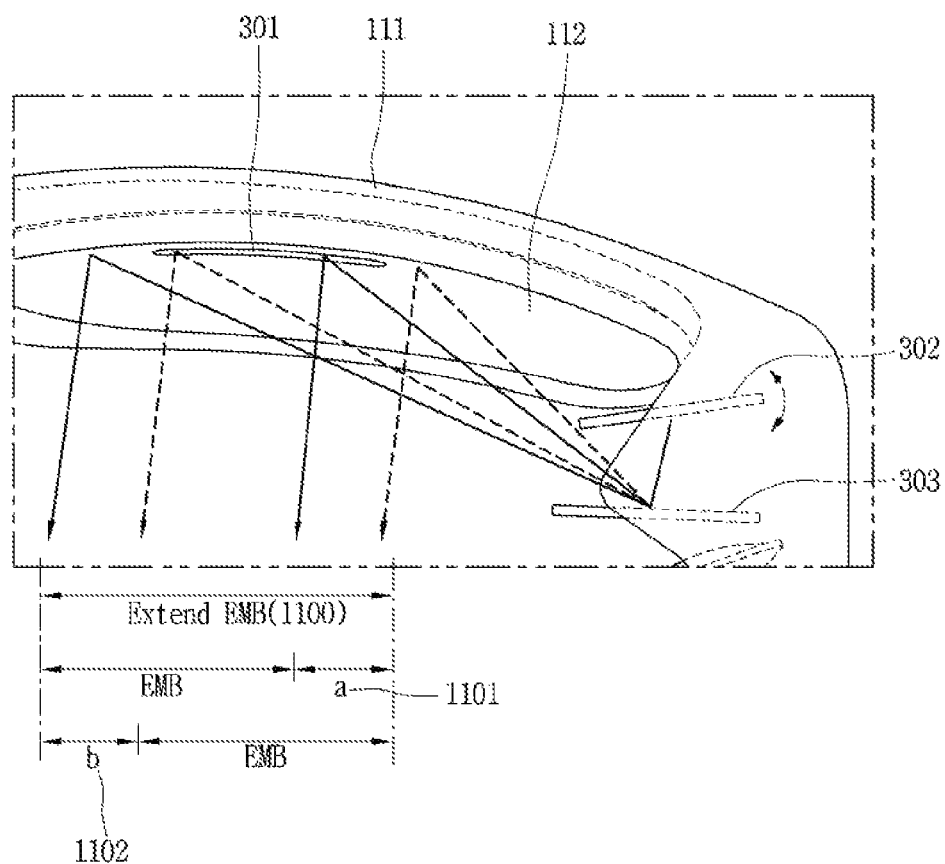
FIG. 17A is a conceptual diagram for explaining a concept in which an eye movement box (EMB) is extended by the tilted first reflection element, in the spectacle-type terminal device according to the present disclosure.

As such, in the present disclosure, as the first reflected element 303 is tilted, a generation location of a virtual image may be moved to a left or right side. Accordingly, an EMB in the present disclosure may be extended in correspondence with a distance by which a generation location of the virtual image may be changed. FIG. 17A is a conceptual diagram for explaining a concept in which an EMB is extended by the first reflection element 303 that is tilted, in the spectacle-type terminal device 1 related to the present disclosure.

As described above, in the spectacle-type terminal device 1 according to an embodiment of the present disclosure, when a part of a virtual image is outside an EMB according to an IPD difference, the first reflection element 303 may rotate to change a location in which the virtual image is provided.

Accordingly, even when a right part of the virtual image is shown as being cut out in correspondence with a length a 1101 according to an IPD difference of a user, as a generation location of the virtual image is moved through rotation of the first reflection element 303, the user may view a whole of the virtual image. In addition, even when a left part of the virtual image is shown as being cut out in correspondence with a length b 1102 according to an IPD difference of a user, as a generation location of the virtual image is moved through rotation of the first reflection element 303, the user may view a whole of the virtual image.

Thus, in the present disclosure, an EMB in which a user may identify a virtual image may be extended from an existing EMB region in correspondence with a region corresponding to the length a 1101 or the length b 1102. Accordingly, an extended EMB region 1100 may be provided as illustrated in FIG. 17A.

Figure 17B:
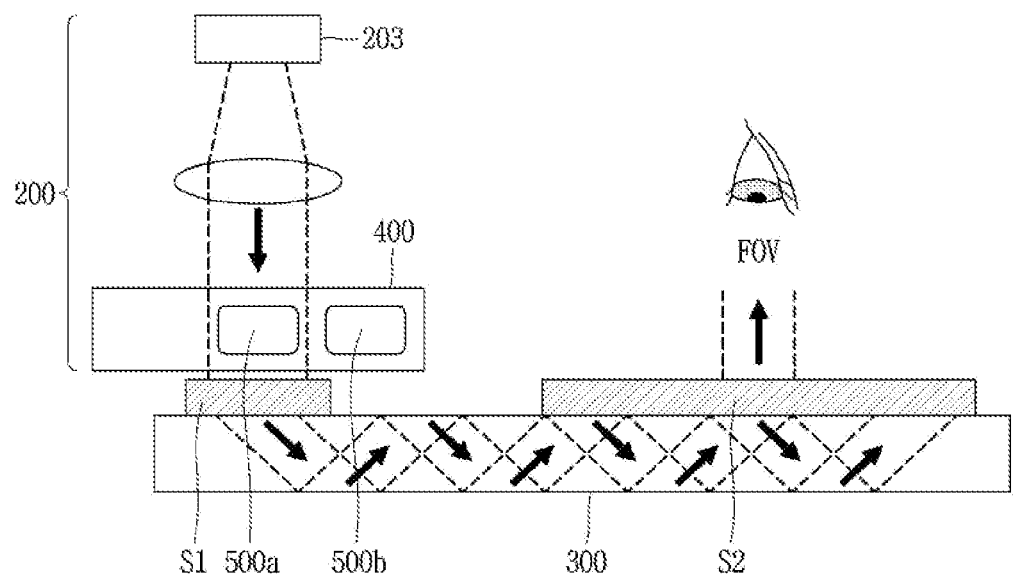
FIGS. 17B and 17C are diagrams schematically illustrating the spectacle-type terminal device in which a display area is changed or expanded in a vertical direction according to the present disclosure.
Figure 17C:
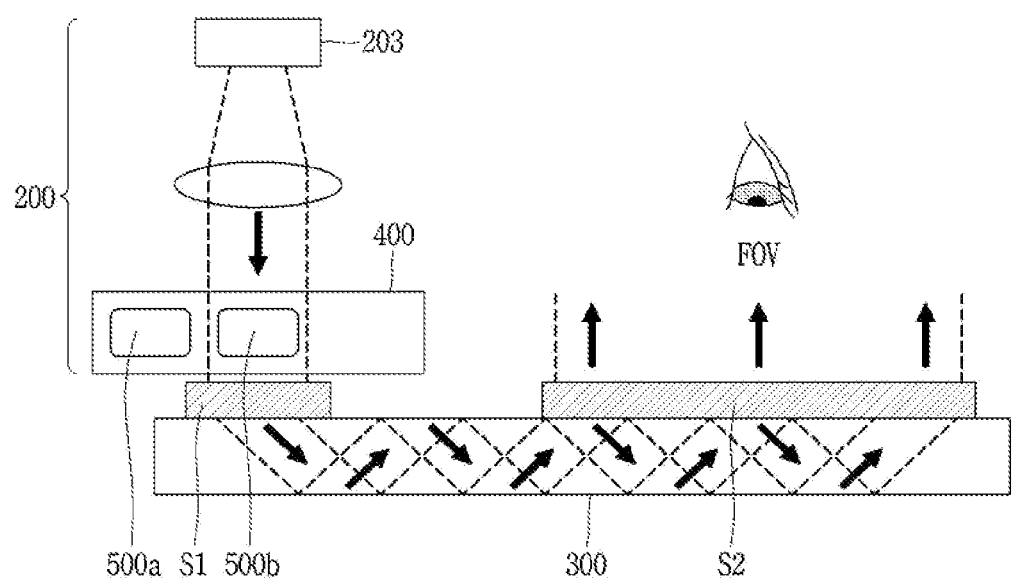

FIGS. 17B and 17C are diagrams schematically illustrating the spectacle-type terminal device in which a display area is changed or expanded in a vertical direction according to the present disclosure.

Referring to FIGS. 17B and 17C, the spectacle-type terminal device 100 described herein includes an optical system 200 and a display unit 300. In relation to this, the optical system 200 and the display unit 300 may correspond to the optical engine 51 and the lens 102 in which the HOE 301 is arranged each illustrated in FIGS. 5A and 11.

The optical system 200 may generate light for implementing an input image. That is, the optical system 200 may generate an image viewed by a user or a video image including sequential images. The optical system 200 may include an image source panel 203 (a display panel) configured to generate an image, a plurality of projection lenses 500, and a location varied portion 400. The optical system 200 may further include a plurality of lenses, etc. configured to diffuse or converge light generated from the image source panel 203. The image source panel 203 may correspond to the display 511 of FIGS. 5A and 11.

The image source panel 203 may include a backlight unit, and a liquid-crystal element configured to modulate light provided from the backlight unit. Alternatively, the image source panel 203 may include a self-emission element including an organic light-emitting diode (OLED) or a light-emitting diode (LED). However, the image source panel 203 is not limited thereto.

A projection lens 500 may receive light from the image source panel 203 and project the light toward an incident region 51 of the display unit 200. The projection lens 500 may collimate or concentrate incident light to provide the incident light to the display unit 300. Hereinafter, a case when the projection lens 500 includes a first projection lens 500a and a second projection lens 500b is described as an example. The projection lens 500 may be referred to as preform lens.

Angles of view of the first projection lens 500a and the second projection lens 500b may be different from each other. For example, the angle of view of the second projection lens 500b may be set to be wider than that of the first projection lens 500a. Hereinafter, for convenience of description, a case when the angle of view of the second projection lens 500b is set to be wider than that of the first projection lens 500a is described as an example.

Positions of the first projection lens 500a and the second projection lens 500b may be switched with each other to be selectively placed in an optical path provided by the image source panel 203. That is, when the first projection lens 500a is located in an optical path provided by the image source panel 203, the second projection lens 500b may be located outside the optical path provided by the image source panel 203. On the other hand, the second projection lens 500b is located in an optical path provided by the image source panel 203, the first projection lens 500a may be located outside the optical path provided by the image source panel 203.

The location varied portion 400 may switch locations of the projection lenses 500 with each other. For example, the location varied portion 400 may switch locations of the first projection lens 500a and the second projection lens 500b with each other. Accordingly, the optical path provided by the image source panel 203 may be selectively matched with the first projection lens 500a or the second projection lens 500b.

In relation to the switching of the locations of the projection lenses 500, referring to FIGS. 5A, 11, 17B, and 17C, a projection location may be switched in one lens included in the lens unit 512. Accordingly, the lens unit 512 may include the first projection lens 500*a* and the second projection lens 500*b* distinguishable in a vertical direction (an upward-downward direction). In relation to this, the first projection lens 500*a* and the second projection lens 500*b* may be configured in a z-direction corresponding to a vertical direction (an upward-downward direction.

The location varied portion 400 may switch locations of the first projection lens 500*a* and the second projection lens 500*b* both included in the lens unit 512. Accordingly, the optical path provided by the display unit 511 may be selectively matched with the first projection lens 500*a* or the second projection lens 500*b*. In relation to this, the first projection lens 500*a* and the second projection lens 500*b* may be configured in a z-direction corresponding to a vertical direction (an upward-downward direction.

As another example, the first projection lens 500*a* and the second projection lens 500*b* may be configured as the second HOE 302. Accordingly, the second HOE 302 may include the first projection lens 500*a* and the second projection lens 500*b* distinguishable in a vertical direction (an upward-downward direction). The location varied portion 400 may change or switch the locations of the first projection lens 500*a* and the second projection lens 500*b* both included in the second HOE 302. Accordingly, the optical path provided by the display unit 511 may be selectively matched with the first projection lens 500*a* or the second projection lens 500*b*.

As an example, the location varied portion 400 may move the second HOE 302 in a vertical direction (an upward-downward direction) to control the first projection lens 500*a* to be arranged in an optical path provided by the display 511. In addition, the location varied portion 400 may move the second HOE 302 in a vertical direction (an upward-downward direction) to control the second projection lens 500*b* to be arranged in an optical path provided by the display 511. As the second HOE 302 is moved in a vertical direction (an upward-downward direction), the first reflection element 303 may be also moved to correspond to the corresponding direction. To do so, the second HOE 302 and the first reflection element 303 may be provided in a same mechanical structure.

When the first projection lens 500*a* is matched with an optical path provided by the display 511, a lens 113 provided with the HOE 301 may provide a field of view (FOV) having a first size. When the second projection lens 500*b* is matched with an optical path provided by the image display 511, the lens 113 provided with the HOE 301 may provide an FOV having a second size. Here, an angle of view of the second projection lens 500*b* may be set to be wider than that of the first projection lens 500*a*.

As another example, when the first projection lens 500*a* is matched with an optical path provided by the display 511, the lens 113 provided with the HOE 301 may provide an FOV of a first region in a vertical direction (an upward-downward direction). When the second projection lens 500*b* is matched with an optical path provided by the display 511, the lens 113 provided with the HOE 301 may provide an FOV of a second region in a vertical direction (an upward-downward direction). Accordingly, an FOV may be variably changed in a vertical direction (an upward-downward direction) of the spectacle-type terminal device. In relation to this, to optimize an FOV and sharpness, the location varied portion 400 may move all components in the optical engine 51 in a synchronized state. The location varied portion 400 may move vertical positions of the display 511, the lens unit 512, the second HOE 303, and the first reflection element 302 in a synchronized state to change an FOV in a vertical direction. Then, the second HOE 303 and the first refection element 302 may be moved to expand the FOV in a vertical direction.

In relation to this, the location varied portion 400 may adjust a field of view (FOV) in a vertical direction. The optical engine 51 may include the display 511, the second HOE 302, and the location varied portion 400. The display 511 may be configured to be arranged in a lower portion of the optical engine 51 having a cylindrical structure. The second HOE 302 may be arranged in an optical path provided by the display 511, and configured to include the first and second projection lenses 500*a* and 500*b* configured such that regions of the first and second projection lenses 500*a* and 500*b* are distinguished in a vertical direction. The location varied portion 400 may control one of the first and second projection lenses 500*a* and 500*b* in an optical path provided by the display 511. Accordingly, the location varied portion 400 may adjust a field of view (FOV) in a vertical direction of the spectacle-type terminal device.

According to another embodiment, the spectacle-type terminal device may be configured to expand vertical coverage of the FOV after changing the FOV in a vertical direction. To do so, the spectacle-type terminal device may further include the controller 10 configured to transmit a control signal to the location varied portion 400. The controller 10 may be configured to be arranged on the PCB 410 and/or the FPCB 420. The controller 10 may move vertical positions of the display 511, the lens unit 512, the second HOE 302, and the first reflection element 303 in a synchronized state, each included in the optical engine 51, to change an FOV in a vertical direction. As another example, the controller 10 may change a tilting angle of the first reflection element 303 in the optical engine 51 in a vertical direction.

Then, the controller 10 may expand vertical coverage of the FOV by moving a vertical position of the second HOE 302 to arrange one of the first and second projection lenses 500*a* and 500*b* in an optical path provided by the display 511.

A switching operation of the projection lenses 500 through the location varied portion 400 may be performed according to external physical force directly provided by a user. Alternatively, a switching operation of the projection lenses 500 through the location varied portion 400 may be controlled by the controller 10 in response to a preset particular signal. That is, a switching operation of the projection lenses 500 through the location varied portion 400 may be controlled by a selected driving device, a driving circuit, etc.

The display unit 300 may enable a user to visually recognize an external environment and also view an image generated by the optical system 200. That is, light provided by the optical system 200 is incident on the display unit 300 through an incident region S1 of the display unit 300, guided in a preset direction, and emitted toward an output region S2 of the display unit 300. Accordingly, a user may recognize an actual image obtained through an opening portion of the frame 100 and a virtual image provided by the optical system 200 simultaneously.

The display unit 300 may provide a field of view (FOV) having a certain size. The FOV may refer to a size of an image recognized by a user in a preset location at preset time. The size of the FOV may be controlled to correspond to an angle of view of the projection lens 500.

For example, when the first projection lens 500*a* is matched with an optical path provided by the image source panel 203, the display unit 300 may provide a field of view (FOV) having the first size. When the second projection lens 500b is matched with an optical path provided by the image source panel 203, the display unit 300 may provide an FOV having the second size. Here, since an angle of view of the second projection lens 500b is set to be wider than that of the first projection lens 500a, the second size may be provided to be larger than the first size. Although not illustrated, when an angle of view of the second projection lens 500b is set to be narrower than that of the first projection lens 500a, the second size may be provided to be smaller than the first size.

The spectacle-type terminal device according to an example embodiment of the present disclosure includes the projection lenses 500 having different angles of view, and the location varied portion 400 configured to switch locations of the projection lenses 500. Accordingly, since an FOV is adjustable, an FOV having a different size may be selectively provided as needed by a user. As an example, in the spectacle-type terminal device of FIGS. 5A and 11, an FOV may be adjusted in a vertical direction. Accordingly, optimum adjustment of a field of view may be performed in a vertical direction according to locations of fields of view in a vertical direction for each user and changes in angles of view and a user environment. In addition, optimum adjustment of a field of view may be performed in a horizontal direction as shown in FIG. 17A, and optimum adjustment of a field of view in a horizontal direction may be performed according to locations of fields of view in a horizontal direction for each user and changes in angles of view and a user environment as shown in FIGS. 17B and 17C.

Accordingly, in an example embodiment of the present disclosure, since an optimum FOV and EMB may be provided both in horizontal and vertical direction according to users and use environment, convenience in use may be remarkably enhanced.

Figure 18A:
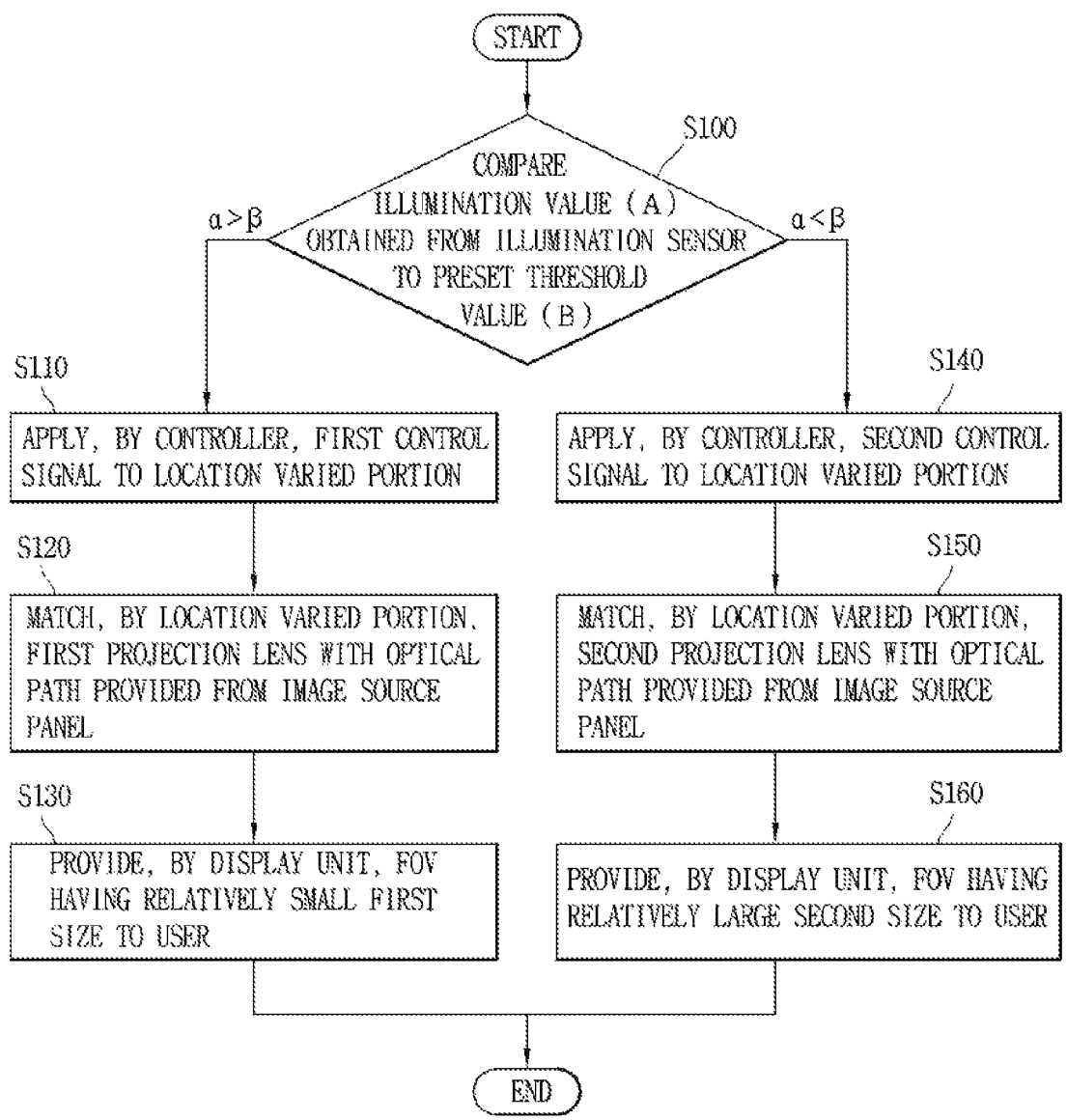
FIG. 18A is a flowchart for explaining an example of operation of the spectacle-type terminal device according to an embodiment.

FIG. 18A is a flowchart for explaining an example of operation of the spectacle-type terminal device according to an embodiment. A controller may control the location varied portion 400 in correspondence with information obtained from a sensor unit configured to sense external information. In relation to this, the controller corresponds to the controller 10 of FIG. 1B, and may be arranged on the PCB 410 and/or the FPCB 420 shown in FIG. 5A.

The controller may generate a preset signal in correspondence with particular information obtained from the sensor unit, and the location varied portion 400 may switch locations of the projection lenses 500 in response to a preset signal.

As an example, the sensor unit may include an illumination sensor configured to sense external illumination. The controller may compare a preset threshold value ($\beta$) to an illumination value ($\alpha$) obtained from sensing by the illumination sensor, and generate a driving signal corresponding thereto to provide the driving signal to the location varied portion 400. In response to the driving signal, the location varied portion 400 may selectively match one of the projection lenses 500 with an optical path provided from the image source panel 203.

Referring to FIG. 18, the controller may obtain an external illumination value ($\alpha$) from the illumination sensor. The controller may compare the illumination value ($\alpha$) obtained from the illumination sensor to a preset threshold value ($\beta$) (S100).

When the obtained illumination value ($\alpha$) is greater than the preset threshold value ($\beta$), the controller may apply a first control signal to the location varied portion 400 (S110). The location varied portion 400 may match the first projection lens 500a with an optical path provided from the image source panel 203, in response to the first control signal (S120). Accordingly, the display unit 300 may provide an FOV having a relatively small first size to a user (S130).

When the obtained illumination value ($\alpha$) is less than the preset threshold value ($\beta$), the controller may apply a second control signal to the location varied portion 400 (S140). The location varied portion 400 may match the second projection lens 500b with an optical path provided from the image source panel 203, in response to the second control signal (S150). Accordingly, the display unit 300 may provide an FOV having a relatively large second size to a user (S160).

Although not illustrated, in an example embodiment of the present disclosure, a state in which one projection lens 500 is matched with an optical path provided from the image source panel 203 may be set as an initial state. In this case, the controller 10 may control the location varied portion 400 to maintain the initial state or switch locations of the projection lenses 500, in correspondence with information obtained through the sensor unit.

Figure 18B:
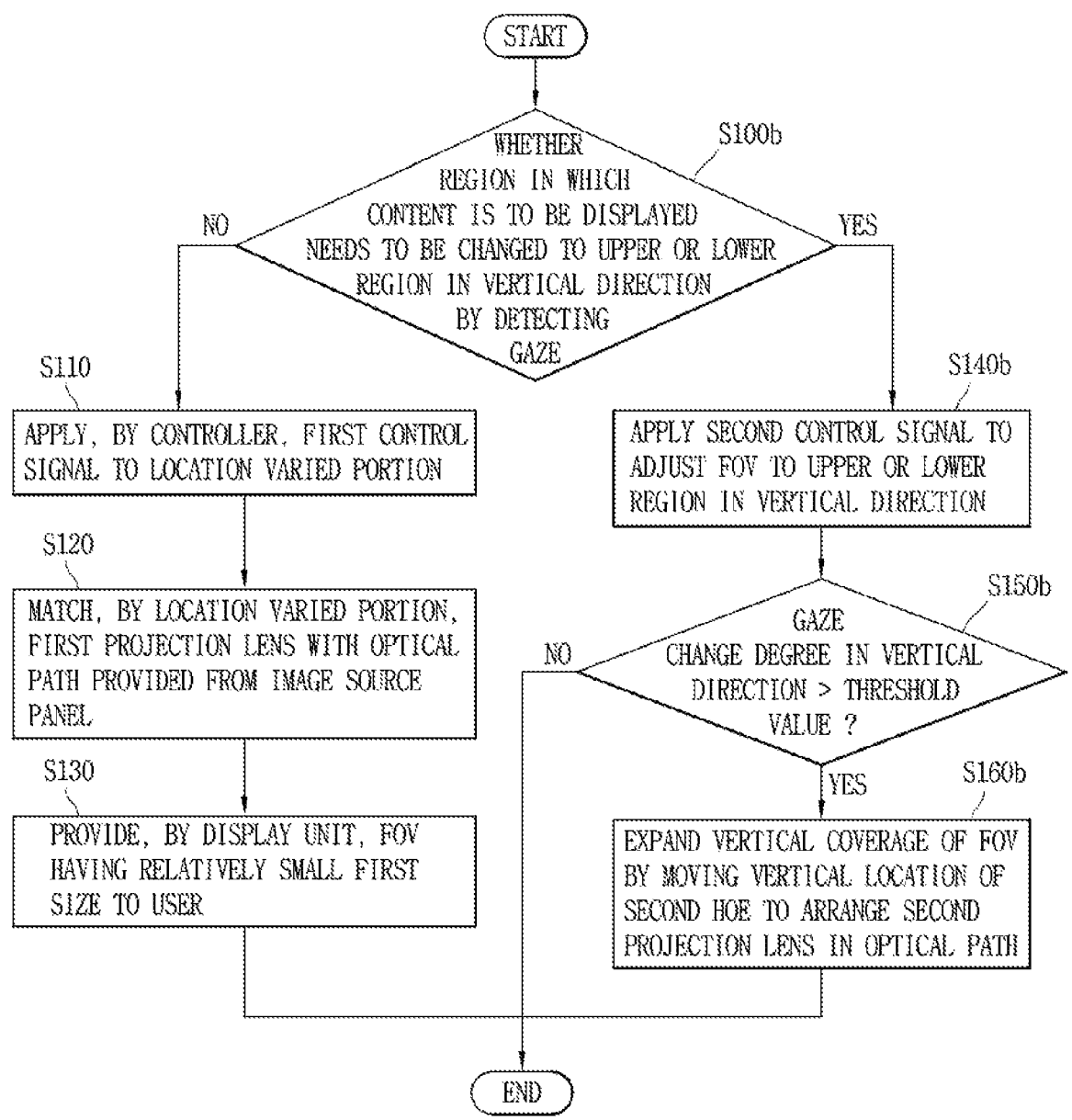
FIG. 18B is a flowchart for explaining an example of operation of a spectacle-type terminal device according to an embodiment.

FIG. 18B is a flowchart for explaining an example of operation of a spectacle-type terminal device according to another embodiment. A controller determines whether a region in which content is to be displayed needs to be changed to an upper or lower region in a vertical direction by detecting a gaze of a user (S100b). When it is determined that the region in which the content is to be displayed does not need to be changed, the first control signal may be applied to the location varied portion 400 (S110). The location varied portion 400 may match the first projection lens 500a with an optical path provided from the image source panel 203, in response to the first control signal (S120). Accordingly, the display unit 300 may provide an FOV having a relatively small first size to a user (S130).

On the other hand, when it is determined that the region in which the content is to be displayed does not need to be changed, the location varied portion 400 may adjust the FOV to an upper or lower region in a vertical direction (S140b). To do so, the controller may apply a second control signal to adjust the FOV to an upper or lower region in a vertical direction. The controller may control the location varied portion 400 to change the FOV in a vertical direction, by moving vertical locations of the display, the lens unit, the second HOE, and the first reflection element, each included in an optical engine, in a synchronization state.

In addition, the controller may determine whether a gaze change degree or a gaze change speed of a user in a vertical direction is greater than a threshold value (S150b). When the gaze change degree or the gaze change speed of the user is greater than the threshold value in a vertical direction, the controller may apply a third control signal. Accordingly, the vertical location of the second HOE may be moved to arrange a second projection lens in an optical path provided from the display, vertical coverage of the FOV may be expanded. As an example, the controller may provide an FOV having a second size in a vertical direction, by controlling the vertical location of the second HOE. To do so, a second region of the second HOE corresponding to the second projection lens may be configured to be different from the first region of the second HOE corresponding to the first projection lens.

Figure 19:
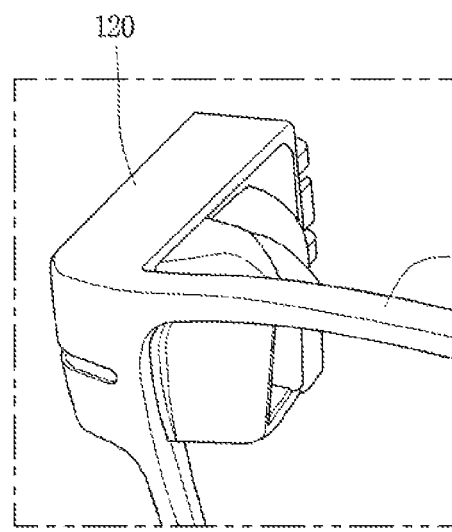
FIG. 19 illustrates an example of a housing of the spectacle-type terminal device 1 including a first reflection element provided to be tiltable and related to the present disclosure.
Figure 19:
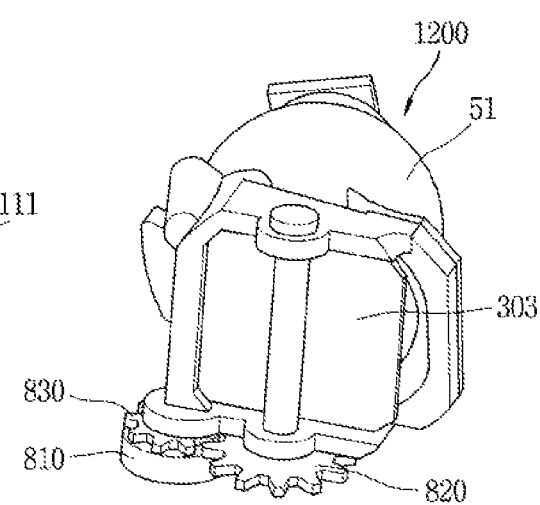
Figure 19:
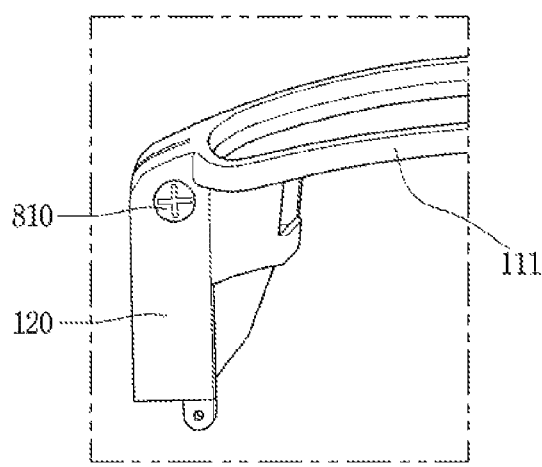
Figure 19:
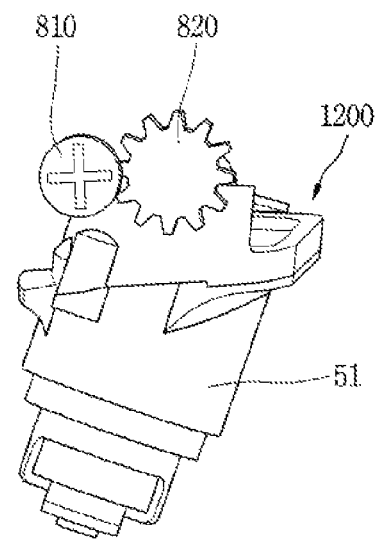

FIG. 19 illustrates an example of a housing 1200 of the spectacle-type terminal device 1 related to the present disclosure and including a first reflection element provided to be tiltable and.

Referring to (a) and (c) of FIG. 19, those drawings illustrate examples in which the housing 1200 is coupled to the body portion 120 of the spectacle-type terminal device 1 viewed from different perspectives. The second frame portion 130 may provide a space in which the housing 1200 is to be mounted, and the housing 1200 may be coupled to the body portion 120 in a form such that the housing 1200 is accommodated in the space provided in the second frame portion 130.

As illustrates in (c) and (d) of FIG. 19, the housing 1200 may be provided to surround the display unit 51 including the optical module 511 and the lens unit 512. In addition, the second hologram optical element 302 may be coupled to the first reflection element 303. Here, the first reflection element 303 may include the rotating shaft 820 including protrusions having a saw-toothed shape to be engaged with at least a part of sawteeth on the gear 830. In addition, the gear 830 may be provided integrally with the dial gage 810 to transmit rotating power according to rotation of the dial gage 810 to the rotating shaft 820.

As illustrated in (c) of FIG. 12, the dial gage 810 may be provided to be exposed to outside of the second frame portion 180. Accordingly, a user may rotate the dial gage 810 and, according to the rotation of the dial gage 810, rotate the first reflection element 303 in a direction of increasing or decreasing an incident angle of light incident on a second surface of the second hologram optical element 302.

In the above description, according to the rotation of the dial gage 810, a configuration in which the first reflection element 303 is tilted is disclosed. On the other hand, however, the first reflection element 303 may be configured to be automatically tilted.

As an example, the tilting portion 800 may further include an actuator configured to provide rotating power to the gear 830, instead of the dial gage 810. In this case, the actuator (not shown) may be provided to rotate the first reflection element 303 using rotating power transmitted via the gear 830, by rotating the gear 830 according to control by the controller 10.

An angle at which the first reflection element 303 rotates through the actuator may be determined by the controller 10 according to a result obtained by sensing an IPD of a user. For example, the controller 10 may calculate a distance between pupils of both eyes of a user based on locations of pupils of both eyes of the user obtained via the camera 31.

Alternatively, an angle between left glass and a left body portion supporting a left leg portion of the spectacle-type terminal device 1, and an angle between right glass and a right body portion supporting a right leg portion of the spectacle-type terminal device 1 may be measured, a head size of the user may be calculated according to the measured angles, and then, an IPD corresponding to the calculated head size may be estimated.

Figure 20A:
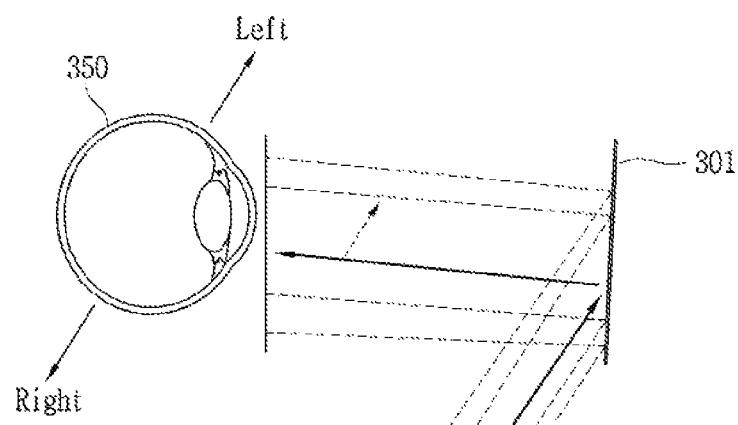
FIGS. 20A and 20B are diagrams for explaining examples of compensating a generation location of a virtual image according to an IPD difference in correspondence with tilting of the display unit 51 provided to be rotatable.
Figure 20A:
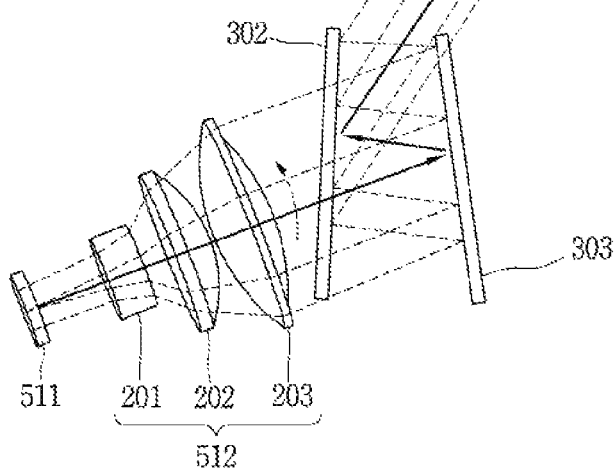
Figure 20A:
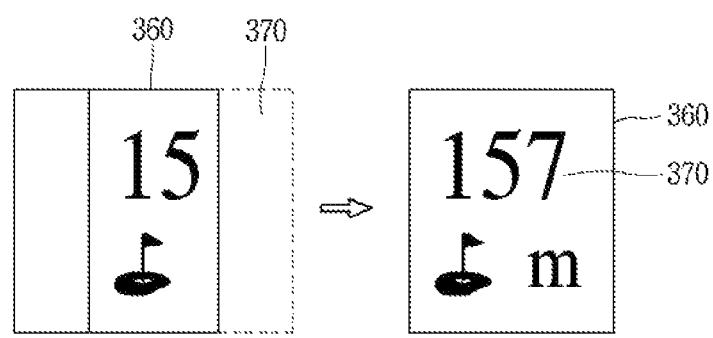
Figure 20B:
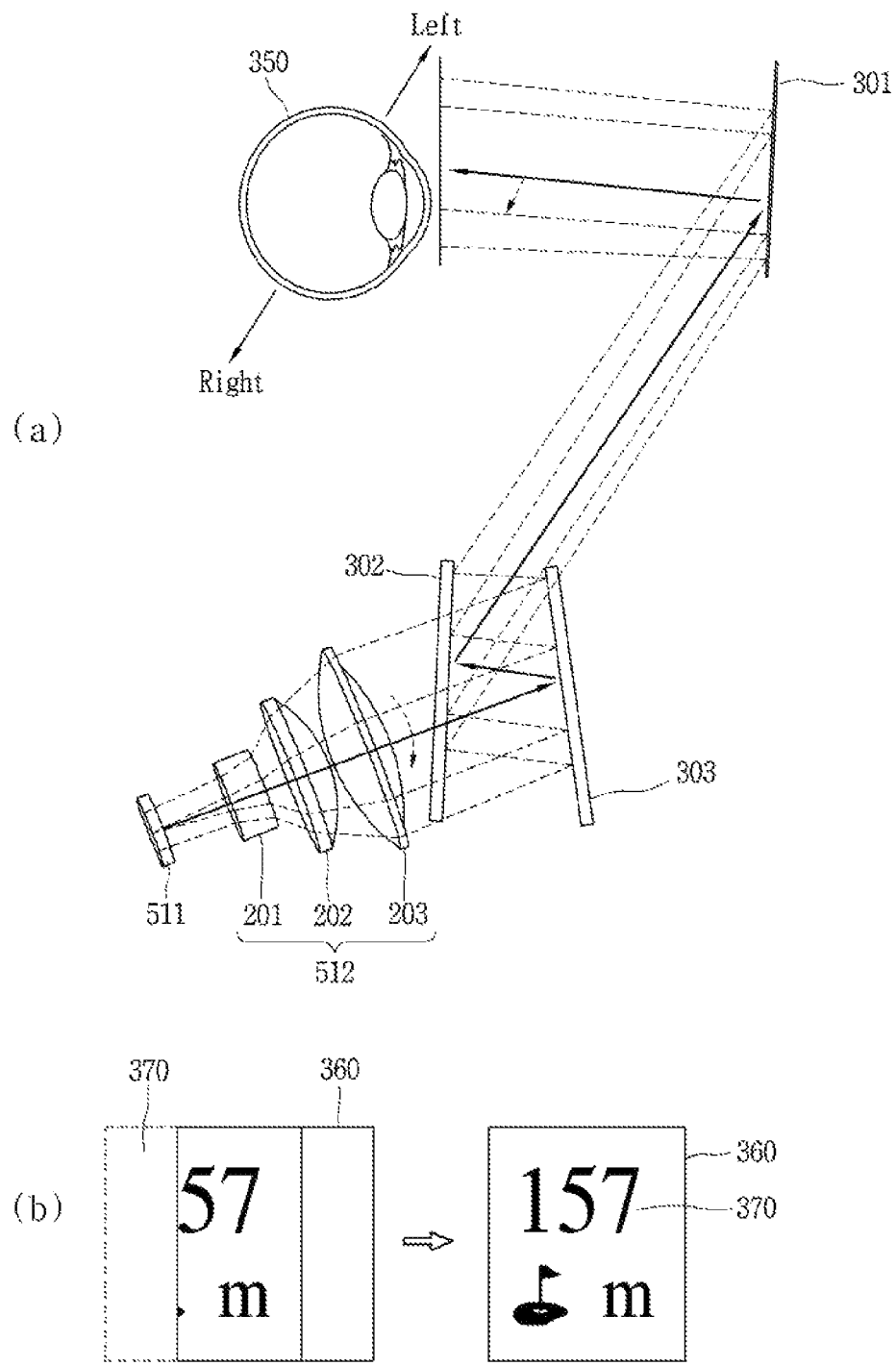

FIGS. 20A and 20B are diagrams for explaining examples of compensating a generation location of a virtual image according to an IPD difference in correspondence with tilting of the display unit 51 provided to be rotatable.

As described above, when the display unit 51 is provided to be rotatable at a certain angle, a direction toward which the display unit 51 is directed may be changed according to rotation. Thus, an incident angle at which parallel light converted by the lens unit 512 is incident on a first surface of the second hologram optical element 302 may be changed. Accordingly, an incident angle at which light is incident on the first reflection element 303 after penetrating through the second hologram optical element 302 may be changed.

In this case, as illustrated in (a) of FIG. 20A, when the display unit 51 is rotated (tilted) in a direction of increasing an incident angle of light incident on the first reflection element 303, an angle at which reflected light of the first reflection element 303 is incident on a second surface of the second hologram optical element 302 may be increased. Then, a reflection angle of the light reflected on the second surface of the second hologram optical element 302 may be also increased. Accordingly, a location in which the reflected light is reflected on the first hologram optical element 301, i.e., a location in which a virtual image is generated may be moved to a left side.

As such, when an incident angle of light incident on the first hologram optical element 301 is increased, a location in which reflected light from the first hologram optical element 301 is incident on pupils of a user may be moved to a left side. Accordingly, as illustrated in (a) of FIG. 14, a generation location of a virtual image viewed by eyes of the user may be moved to a left side.

Therefore, as an IPD of the user is less than a preset level, when the virtual image 370 is outside the EMB 360 and thus a right part of the virtual image 370 is shown as being cut out as illustrated in a first drawing (a left drawing) of (b) of FIG. 14, a location in which the virtual image 370 is displayed may be moved to a left side. Accordingly, as illustrated in a second drawing (a right drawing) of (b) of FIG. 19A, a virtual image may be changed to a state in which a whole of the virtual image is displayed in the EMB 360, and accordingly, the user may view the whole virtual image with naked eyes.

On the contrary, as illustrated in (a) of FIG. 20B, when the display unit 51 is rotated (tilted) in a direction of decreasing an incident angle of light incident on the first reflection element 303, an incident angle at which light is incident on a second surface of the second hologram optical element 302 may be decreased due to reflected light on the first reflection element 303. Then, a reflection angle of the light reflected on the second surface of the second hologram optical element 302 may be also decreased. Accordingly, a position in which the reflected light is reflected on the first hologram optical element 301, i.e., a location in which a virtual image is generated may be moved to a right side.

As such, when an incident angle of light incident on the first hologram optical element 301 is decreased, a location in which reflected light on the first hologram optical element 301 is incident on pupils of a user may be moved to a right side. Accordingly, as illustrated in (a) of FIG. 19B, a generation location of a virtual image viewed by eyes of the user may be moved to a right side.

Therefore, as an IPD of the user is greater than a preset level, when the virtual image 370 is outside the EMB 360 and thus a left part of the virtual image 370 is shown as being cut out as illustrated in a first drawing (a left drawing) of (b) of FIG. 19B, a display position of the virtual image 370 may be moved to a right side. Accordingly, as illustrated in a second drawing (a right drawing) of (b) of FIG. 19B, a virtual image may be changed to a state in which a whole of the virtual image is displayed in the EMB 360, and accordingly, the user may view the whole virtual image with naked eyes.

In the above description, an example of providing an optical path in which, after being output from the display unit 51 via the second hologram optical element 302 and the first reflection element 303, light reaches the first hologram optical element 301 configured to define an EMB is described. However, an optical path in which light output from the display unit 51 reaches the first hologram optical element 301 using one diffraction element configured to refract incident light at a preset angle may be also provided.

Figure 21A:
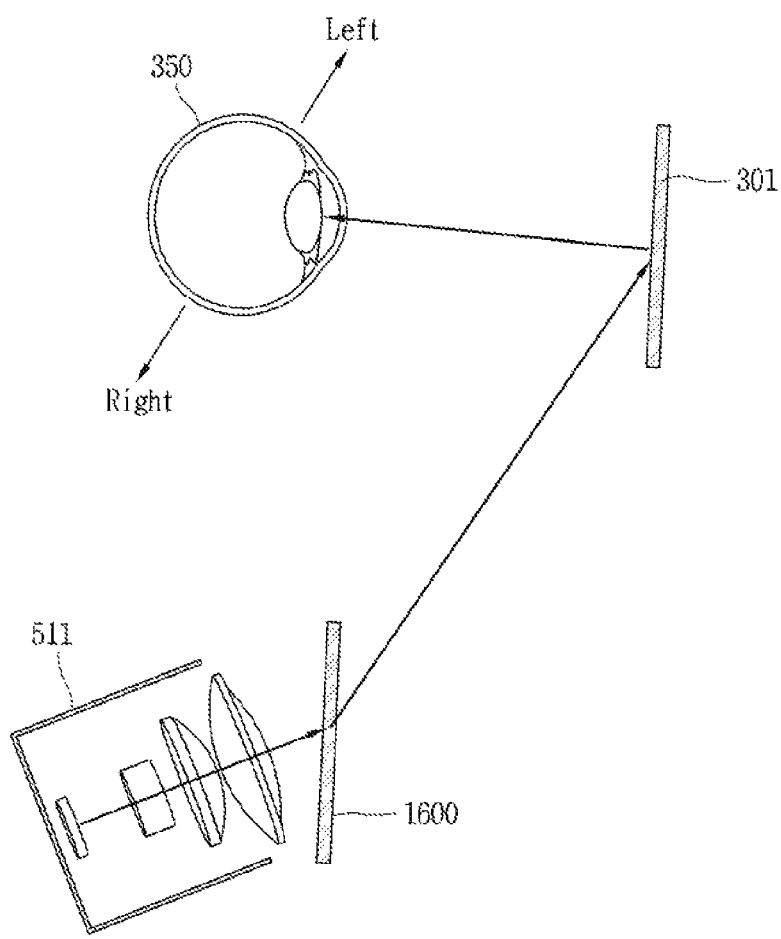
FIG. 21A illustrates an example of an optical system configured to transmit light output from a display unit to a first hologram optical element via one diffract element.

FIG. 21A illustrates an example of an optical system configured to transmit light output from the display unit 51 to the first hologram optical element 301 via one diffract element.

Referring to FIG. 21A, the display unit 51 of the spectacle-type terminal device 1 according to an embodiment of the present disclosure may allow parallel light converted through the lens unit 512 to be incident on a preset first surface of a diffraction element 1600. Then, the incident parallel light may be redirected at a preset angle through the diffraction at the diffraction element 1600, and the parallel light may be incident on the first hologram optical element 301 through the redirection.

Here, the diffraction element 1600 may be a hologram optical element configured to, when light is incident at an angle within a certain range, redirect the incident light at a preset angle to transmit the incident light. In this case, light diffracted at the diffraction element 1600 may be positively dispersed in a diffraction process. Thus, the positively dispersed light may be incident on the first hologram optical element 301.

Accordingly, the first hologram optical element 301 may be an optical element configured to negatively disperse incident light to offset the dispersion (positive dispersion) of the light. Accordingly, the light diffracted and dispersed at the diffraction element 1600 may be negatively dispersed and reflected by the first hologram optical element 301 to be incident on pupils of a user. Accordingly, a virtual image which does not include light noise according to dispersion may be provided on one region (an EMB) on the glass 112.

Light from an image source may be transmitted to the first hologram optical element 301 through one diffraction element. In relation to this, FIG. 21B is a conceptual diagram for explaining the spectacle-type terminal device 1 related to the present disclosure and configured to compensate for a virtual image generation position according to an IPD difference in correspondence with tilting of the display unit 51.

Figure 21B:
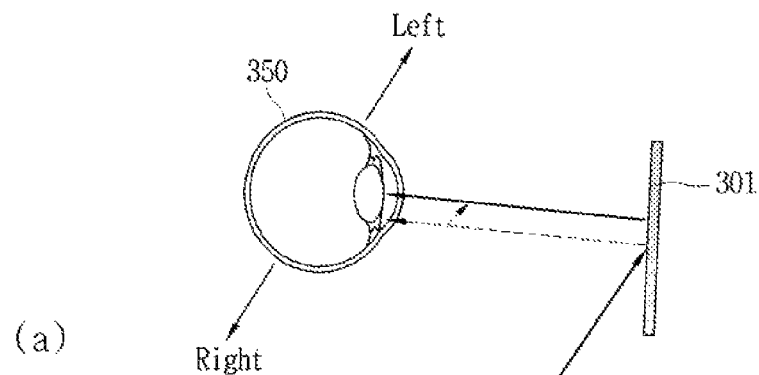
FIG. 21B is a conceptual diagram for explaining the spectacle-type terminal device related to the present disclosure, the spectacle-type terminal device being configured to compensate for a generation location of a virtual image according to an IPD difference in correspondence with tilting of a display unit.
Figure 21B:
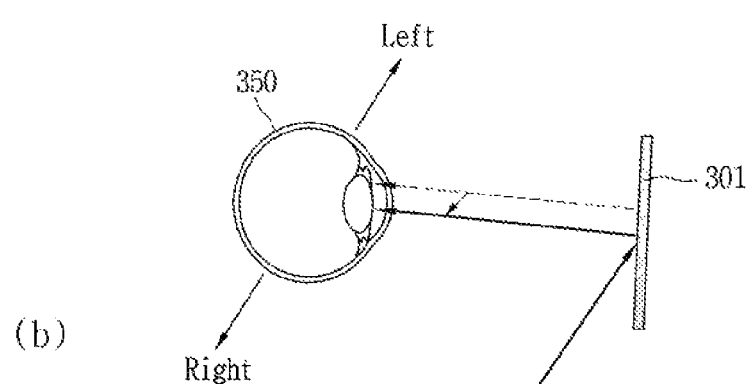

Referring to (a) of FIG. 21B, when the display unit 51 is rotated in a direction of increasing an incident angle at which light output from the display unit 51 is incident on the diffraction element 1600, an incident angle of light incident on the first hologram optical element 301 through the diffraction element 1600 may be also increased.

Accordingly, a position of an incident point of light incident on the first hologram optical element 301 may be moved to a left side. Accordingly, since a position of an incident point of reflected light incident on pupils of a user after being reflected on the first hologram optical element 301 is moved to a left side, a generation location of a virtual image viewed by eyes of the user may be moved to a left side.

Therefore, since an IPD of the user is narrower than a preset level, when a right part of the virtual image is not viewable, a generation location of the virtual image may be moved to a left side by tilting the display unit 51 at a certain angle. Accordingly, even when an IPD of a user is less than a preset level, a whole of the virtual image may be viewed without cutout of one side of the virtual image by displaying the virtual image in an EMB.

On the other hand, referring to (b) of FIG. 21B, when the display unit 51 is rotated in a direction of decreasing an incident angle at which light output from the display unit 51 is incident on the diffraction element 1600, an incident angle of the light incident on the first hologram optical element 301 through the diffraction element 1600 may be decreased.

Thus, a position of an incident point of light incident on the first hologram optical element 301 may be moved to a right side. Accordingly, since a position of an incident point of light incident on pupils of a user after being reflected on the first hologram optical element 301 is moved to a right side, a generation location of a virtual image viewed by eyes of the user may be moved to a right side.

Therefore, since an IPD of the user is greater than a preset level, when a left part of the virtual image is not viewable, a generation location of the virtual image may be moved to a right side by tilting the display unit 51 at a certain angle. Accordingly, even when the IPD of the user is greater than a preset level, a whole of the virtual image may be viewed without cutout of one side of the virtual image by displaying the virtual image in an EMB.

As described above, the first reflection element 303 is a full-reflection mirror or a half-reflection mirror. However, the present disclosure is not limited thereto.

As an example, it is described that a hologram optical element has characteristics of reflecting light when the light is incident at an angle outside preset incident angles at which light is transmitted, Accordingly, when such reflection characteristics of the hologram optical element are used, the hologram optical element may be used as the first reflection element 303.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include the controller 10 of the spectacle-type terminal device 1.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A spectacle-type terminal device comprising:
   a lens;
   a front body portion on which parts are mountable, the front body portion configured to support and secure the lens; and
   an optical engine disposed within the front body portion and configured to generate an image light that serves as an image source of a virtual image,
   wherein the optical engine comprises a diffraction element configured to reflectively diffract the image light at a preset angle,
   wherein a holographic optical element (HOE) is provided in at least one area of photopolymers located at an inner surface or an inside area of the lens, to display the virtual image corresponding to the image light by diffracting the image light,
   wherein the photopolymers and the optical engine are arranged in the front body portion, and
   wherein the HOE comprises a first HOE configured to, when the image light is dispersed by being reflectively diffracted, offset the dispersion of the image light and reflect the image light having the dispersion that is offset, to display the virtual image corresponding to the image light.

2. The spectacle-type terminal device of claim 1, wherein the diffraction element comprises:
- a second HOE configured to transmit light that is incident at an angle within a preset range of incident angles, and reflect light that is incident at an angle within a preset range of reflection angles; and
- a first reflection element having a reflection surface, wherein the first reflection element is arranged so that the reflection surface is directed toward the second HOE at a preset angle.

3. The spectacle-type terminal device of claim 2, wherein the optical engine has a cylindrical structure, and wherein the first reflection element of the diffraction element and a second reflection element of the second HOE are arranged at an upper region of the cylindrical structure at different angles, such that the image light is reflected by the first reflection element and the second reflection element and is directed toward the HOE provided in the at least one area of photopolymers.

4. The spectacle-type terminal device of claim 3, wherein a micro display is arranged at a lower portion of the cylindrical structure to output image light having a certain wavelength band, and
- wherein the micro display is arranged to be directed toward the second HOE at an angle within a range of incident angles, such that image light incident on the second HOE penetrates through the second HOE.

5. The spectacle-type terminal device of claim 2, wherein the first reflection element is arranged to be inclined further toward one axial direction compared to the second HOE, and configured to reflect light having penetrated through a first surface of the second HOE onto a second surface of the second HOE, and
- wherein the reflection surface of the first reflection element and the second surface of the second HOE are arranged to face each other, so that a first path in which light penetrates through the second HOE and proceeds toward the reflection surface of the first reflection element overlaps a second path in which light having been reflected by the reflection surface of the first reflection element proceeds toward the second surface of the second HOE.

6. The spectacle-type terminal device of claim 2, further comprising a tilting portion configured to change an angle at which the reflection surface is directed toward the second HOE, by rotating the first reflection element at a certain angle.

7. The spectacle-type terminal device of claim 2, wherein, when the first reflection element rotates to increase an incident angle of light incident on a second surface of the second HOE, a display position of the virtual image on the lens is moved in a direction towards a middle portion between eyebrows of a user, and
- wherein, when the first reflection element rotates to decrease the incident angle of the light incident on the second surface of the second HOE, the display position of the virtual image on the lens is moved in a direction towards temples of the user.

8. The spectacle-type terminal device of claim 2, wherein the optical engine further comprises:
- a display arranged at a lower portion of the optical engine having a cylindrical structure;
- the second HOE comprising a first projection lens and a second projection lens which are controllable to be arranged along an optical path of light provided by the display and which have regions distinguishable from each other with respect to a vertical direction of the spectacle-type terminal device; and
- a location varied portion configured to adjust a field of view (FOV) in the vertical direction by controlling one of the first projection lens or the second projection lens to be arranged in the optical path provided by the display.

9. The spectacle-type terminal device of claim 8, further comprising a controller configured to transmit a control signal to the location varied portion,
wherein the controller is further configured to:
change the FOV in the vertical direction, by moving vertical positions of the display, the lens, the second HOE and the first reflection element of the optical engine in a synchronized state; and
extend a vertical coverage of the FOV by moving the vertical position of the second HOE to arrange the one of the first projection lens or the second projection lens in the optical path provided by the display.

10. The spectacle-type terminal device of claim 1, wherein the optical engine is mounted at an internal region of a body portion that is integral with a front frame of the front body portion to prevent a change in an arrangement location of the optical engine due to a force that twists a structure of the front body portion when the spectacle-type terminal device is worn.

11. The spectacle-type terminal device of claim 10, further comprising:
- a temple body portion coupled to the front body portion by a hinge portion to be foldable at a certain angle with respect to the front body portion; and
- a flexible printed circuit board (FPCB) electrically coupled to the optical engine and arranged at the front body portion and the temple body portion to surround the hinge portion.

12. The spectacle-type terminal device of claim 11, further comprising a printed circuit board (PCB) electrically coupled to the FPCB, arranged to be erected at an internal region of the temple body portion at a certain angle, and having a certain length and width,
- wherein the PCB is arranged at the temple body portion instead of the front body portion to reduce a thickness of the spectacle-type terminal device during folding.

13. The spectacle-type terminal device of claim 12, wherein a battery is arranged at an internal region of the PCB and an empty space of the temple body portion so that the PCB and the battery are accommodated in the empty space of the temple body portion, and
- wherein the PCB receives power from the battery to supply the power to the optical engine.

14. The spectacle-type terminal device of claim 12, wherein a button portion exposed at a lower region of the temple body portion, and a button structure into which the button portion is inserted is located inside the temple body portion, and
- wherein the button structure includes a waterproof member including a silicon or a rubber material to prevent penetration of a liquid foreign material through the lower region of the temple body portion.

15. The spectacle-type terminal device of claim 11, further comprising an FPCB shield membrane arranged outside the hinge portion so that, when the FPCB is arranged to surround the hinge portion, the FPCB is not exposed even when the spectacle-type terminal device is folded.

16. The spectacle-type terminal device of claim 11, further comprising a first rim and a second rim, wherein each of the first rim and the second rim surrounds the FPCB, wherein the first rim has a plate shape to fix the FPCB to a first region of the front body portion, and wherein the second rim has a plate shape to fix the FPCB to a second region of the temple body portion.

17. The spectacle-type terminal device of claim 16, wherein the first rim is fixed to the first region to prevent penetration of a liquid foreign material, introduced during folding, into the front frame, and wherein the second rim is fixed to the second region to prevent penetration of the liquid foreign material into the front frame.

18. The spectacle-type terminal device of claim 10, wherein a front frame rim is provided at a front frame of the front body portion so that the lens and the photopolymers are secured to the front frame, and wherein a point adhesive or a resin is provided on side surfaces of the lens and the photopolymers to prevent penetration of a liquid foreign material.

19. The spectacle-type terminal device of claim 18, wherein the point adhesive or the resin is provided in the front frame to be prevented from being inclined toward one side or from overflowing, and wherein a spacer structure is arranged at an internal space of an external body of the front frame.

\* \* \* \* \*